US010014897B2

(12) United States Patent
Black et al.

(10) Patent No.: US 10,014,897 B2
(45) Date of Patent: Jul. 3, 2018

(54) PROXIMAL USER DETECTION WITH MEASUREMENT RECEIVER

(71) Applicant: Motorola Mobility LLC, Chicago, IL (US)

(72) Inventors: Gregory R Black, Vernon Hills, IL (US); Armin W Klomsdorf, Chicago, IL (US); Andrew Peter Pavacic, Mundelein, IL (US); Dale Schwent, Schaumburg, IL (US)

(73) Assignee: Motorola Mobility LLC, Chicago, IL (US)

( * ) Notice: Subject to any disclaimer, the term of this patent is extended or adjusted under 35 U.S.C. 154(b) by 98 days.

(21) Appl. No.: 14/930,717

(22) Filed: Nov. 3, 2015

(65) Prior Publication Data

US 2017/0126265 A1    May 4, 2017

(51) Int. Cl.
*H04L 12/66* (2006.01)
*H04B 1/3827* (2015.01)
*H04W 88/02* (2009.01)
*H04W 52/38* (2009.01)
*H04W 52/36* (2009.01)
*H04B 17/10* (2015.01)

(52) U.S. Cl.
CPC ......... *H04B 1/3838* (2013.01); *H04B 17/101* (2015.01); *H04W 52/367* (2013.01); *H04W 52/38* (2013.01); *H04W 88/02* (2013.01); *H04B 17/102* (2015.01); *H04B 17/103* (2015.01)

(58) Field of Classification Search
CPC ..... H04W 24/10; H04W 52/38; H04W 88/02; H04B 1/3838
See application file for complete search history.

(56) References Cited

U.S. PATENT DOCUMENTS

| 8,712,355 | B2 | 4/2014 | Black et al. | |
|---|---|---|---|---|
| 2011/0002080 | A1* | 1/2011 | Ranta | H03M 1/1061 361/277 |
| 2011/0059706 | A1* | 3/2011 | Harel | H04B 7/0404 455/115.1 |
| 2011/0086600 | A1* | 4/2011 | Muhammad | H04B 1/0458 455/120 |

(Continued)

OTHER PUBLICATIONS

Gregory R. Black, et al., "Hand Grip Sensor for External Chassis Antenna", U.S. Appl. No. 14/280,760, filed May 19, 2014.

*Primary Examiner* — Abdelnabi O Musa
(74) *Attorney, Agent, or Firm* — Yudell Isidore PLLC

(57) ABSTRACT

A method, communication device, and computer program product mitigate Specific Absorption Rating (SAR) exposure to a user proximate to a communication device. The method includes an on-device measurement receiver of a communication device detecting a first signal level corresponding to power delivered to a first antenna. The method includes a controller determining a first return loss value based on a first transmit power setting and the first signal level. The method includes the controller determining whether the first return loss value differs from a baseline value by a threshold amount. In response to the controller determining that the first return loss value differs by the threshold amount, the controller causes the communication device to reduce the power delivered to the first antenna.

14 Claims, 20 Drawing Sheets

(56) References Cited

U.S. PATENT DOCUMENTS

| | | | |
|---|---|---|---|
| 2012/0041699 A1* | 2/2012 | Sestok | H03H 7/40 |
| | | | 702/65 |
| 2012/0094708 A1* | 4/2012 | Park | H04B 1/0458 |
| | | | 455/522 |
| 2012/0214422 A1* | 8/2012 | Shi | H04B 1/3838 |
| | | | 455/67.11 |
| 2014/0159501 A1* | 6/2014 | Kanno | H02J 17/00 |
| | | | 307/104 |
| 2014/0378098 A1 | 12/2014 | Trocke et al. | |
| 2015/0044977 A1 | 2/2015 | Ramasamy et al. | |
| 2015/0201387 A1* | 7/2015 | Khawand | H04W 52/265 |
| | | | 455/452.1 |
| 2015/0270608 A1* | 9/2015 | Sub Shin | H01O 1/243 |
| | | | 343/722 |
| 2015/0382307 A1* | 12/2015 | Harper | H04W 52/246 |
| | | | 455/103 |
| 2016/0174168 A1* | 6/2016 | Lu | H04W 52/146 |
| | | | 455/522 |

* cited by examiner

TABLE 1

| Main Antenna | | Gmatch Target (dB) | Simulated Gmatch (dB) | Margin to Target (dB) | |
|---|---|---|---|---|---|
| Mode | Band | Free Space | Free Space | Free Space | |
| Rx | B01 | −2.0 | −1.6 | 0.4 | ⎫ |
| Rx | B02 | −2.0 | −0.7 | 1.3 | |
| Rx | B03 | −3.5 | −1.1 | 2.4 | |
| Rx | B04 | −2.9 | −1.4 | 1.5 | |
| Rx | B05 | −3.8 | −2.3 | 1.5 | |
| Rx | B07 | −7.0 | −2.3 | 4.7 | |
| Rx | B08 | −4.0 | −3.0 | 1.0 | |
| Rx | B12 | −6.6 | −1.2 | 5.4 | |
| Rx | B13 | −4.7 | −1.3 | 3.4 | |
| Rx | B30 | −4.5 | −2.2 | 2.3 | |
| Rx | B41 | −4.7 | −2.3 | 2.4 | ⎬ Margin > 0 |
| Tx | B01 | −2.4 | −0.9 | 1.5 | |
| Tx | B02 | −1.9 | −1.0 | 0.9 | |
| Tx | B03 | −2.3 | −1.5 | 0.8 | |
| Tx | B04 | −2.0 | −1.5 | 0.5 | |
| Tx | B05 | −2.8 | −1.9 | 0.9 | |
| Tx | B07 | −3.3 | −2.2 | 1.1 | |
| Tx | B08 | −2.2 | −2.0 | 0.2 | |
| Tx | B12 | −2.8 | −2.6 | 0.2 | |
| Tx | B13 | −2.6 | −1.5 | 1.1 | |
| Tx | B30 | −2.1 | −2.0 | 0.1 | ⎭ |
| Tx | B41 | −2.2 | −2.3 | −0.1 | } −1 < Margin < 0 |

FIG. 3

TABLE 2

| Main Antenna | | Gmatch Target (dB) | Simulated Gmatch (dB) | Margin to Target (dB) | |
|---|---|---|---|---|---|
| Mode | Band | Free Space | Free Space | Free Space | |
| Rx | B01 | − 2.0 | − 1.9 | 0.1 | |
| Rx | B02 | − 2.0 | − 0.6 | 1.4 | |
| Rx | B03 | − 3.5 | − 1.0 | 2.5 | |
| Rx | B04 | − 2.9 | − 1.7 | 1.2 | |
| Rx | B05 | − 3.8 | − 2.8 | 1.0 | |
| Rx | B07 | − 7.0 | − 2.2 | 4.8 | |
| Rx | B08 | − 4.0 | − 3.9 | 0.1 | |
| Rx | B12 | − 6.6 | − 1.9 | 4.7 | |
| Rx | B13 | − 4.7 | − 3.0 | 1.7 | |
| Rx | B30 | − 4.5 | − 2.0 | 2.5 | |
| Rx | B41 | − 4.7 | − 2.2 | 2.5 | |
| Tx | B01 | − 2.4 | − 0.6 | 1.8 | Margin > 0 |
| Tx | B02 | − 1.9 | − 0.8 | 1.0 | |
| Tx | B03 | − 2.3 | − 1.8 | 0.5 | |
| Tx | B04 | − 2.0 | − 1.8 | 0.2 | |
| Tx | B05 | − 2.8 | − 2.0 | 0.8 | |
| Tx | B07 | − 3.3 | − 2.0 | 1.3 | |
| Tx | B08 | − 2.2 | − 2.0 | 0.2 | |
| Tx | B12 | − 2.8 | − 1.6 | 1.2 | |
| Tx | B13 | − 2.6 | − 1.8 | 0.8 | |
| Tx | B30 | − 2.1 | − 1.9 | 0.2 | |
| Tx | B41 | − 2.2 | − 2.2 | 0.0 | |

*FIG. 6*

TABLE 3

| Main Antenna | | Gmatch Target (dB) | Simulated Gmatch (dB) | Margin to Target (dB) | |
|---|---|---|---|---|---|
| Mode | Band | Free Space | Free Space | Free Space | |
| Rx | B01 | −2.0 | −1.9 | 0.1 | ⎫ |
| Rx | B02 | −2.0 | −0.6 | 1.4 | |
| Rx | B03 | −3.5 | −1.0 | 2.5 | |
| Rx | B04 | −2.9 | −1.7 | 1.2 | |
| Rx | B05 | −3.8 | −2.2 | 1.6 | |
| Rx | B07 | −7.0 | −2.2 | 4.8 | |
| Rx | B08 | −4.0 | −3.9 | 0.1 | |
| Rx | B12 | −6.6 | −1.6 | 5.0 | ⎬ Margin > 0 |
| Rx | B13 | −4.7 | −4.4 | 0.3 | |
| Rx | B30 | −4.5 | −2.0 | 2.5 | |
| Rx | B41 | −4.7 | −2.2 | 2.5 | |
| Tx | B01 | −2.4 | −0.6 | 1.8 | |
| Tx | B02 | −1.9 | −0.8 | 1.0 | |
| Tx | B03 | −2.3 | −1.8 | 0.5 | ⎭ |
| Tx | B04 | −2.0 | −1.8 | 0.2 | ⎫ −1 < Margin |
| Tx | B05 | −2.8 | −3.0 | −0.2 | ⎬ < 0 |
| Tx | B07 | −3.3 | −2.0 | 1.3 | ⎫ Margin > 0 |
| Tx | B08 | −2.2 | −2.0 | 0.2 | ⎭ |
| Tx | B12 | −2.8 | −2.6 | 0.2 | ⎫ −1 < Margin |
| Tx | B13 | −2.6 | −2.6 | 0.0 | ⎬ < 0 |
| Tx | B30 | −2.1 | −1.9 | 0.2 | ⎫ Margin > 0 |
| Tx | B41 | −2.2 | −2.2 | 0.0 | ⎭ |

*FIG. 9*

PROXIMAL USER DETECTION WITH MEASUREMENT RECEIVER

1. TECHNICAL FIELD

The present disclosure generally relates to user proximity detection by a communication device and more particularly to detecting and mitigating Specific Absorption Rate (SAR) exposure to a user of the communication device.

2. DESCRIPTION OF THE RELATED ART

Mobile device regulatory requirements for Specific Absorption Rating (SAR) in body-worn user position cases are making antenna design increasingly difficult. In addition, there are now SAR performance requirements for Wireless Local Access Network (WLAN) access points ("mobile hot spot" devices), and for devices with display sizes greater than 6" (e.g., tablet devices). For these requirements, the SAR is measured in a slab of material ("flat phantom") having dielectric properties representative of the human body, with the device in various orientations (e.g. front or back) at a distance of 10 mm or less. In today's products, when a proximal user position, such as a body-worn position, is detected, the transmitter output power is reduced such that the SAR does not exceed the regulatory limits. The tests for compliance with these requirements include a SAR measurement with a limit of 1.2 W/Kg in a 1 g average at 10 mm spacing. If that limit is exceeded then there is a second measurement with a limit of 4 W/Kg in a 10 g average at 0 mm spacing.

Today's devices employ capacitive sensors to detect the body-worn position. The same capacitive sensors are used in adaptive antenna impedance matching to detect antenna impedance changes associated with the free space (FS) case and user position cases, such as the Beside-Head (BH) and the beside-head with hand (BHH) cases. In this way, the antenna matching circuit can be adjusted to improve the Total Radiated transmit Power (TRP) and Total Integrated Sensitivity (TIS). In existing products, capacitive sensors are used to detect various user positions for several purposes, including SAR reduction and adaptive antenna impedance matching for TRP and TIS improvement.

BRIEF DESCRIPTION OF THE DRAWINGS

The description of the illustrative embodiments is to be read in conjunction with the accompanying drawings, wherein:

FIG. 3 illustrates a first table of free space performance results of a simulation of the circuit schematic of FIG. 2, optimized for transmit and receive power, according to one or more embodiments;

FIG. 6 illustrates a second table of free space performance results of a simulation of the circuit schematic of FIG. 2, optimized for RL in the 10 m phantom position, according to one or more embodiments;

FIGS. 7A-8B illustrate graphical plots respectively of a low band and a high band of a return loss calculations for a second antenna matching circuit design, in the free space and 10 mm slab positions, according to one or more embodiments;

FIGS. 8A-8B illustrate graphical plots respectively of a low band and a high band of a return loss calculations for a second antenna matching circuit design, in the free space and 0 mm slab positions, according to one or more embodiments;

FIG. 9 illustrates a third table of free space performance results of a simulation of the circuit schematic of FIG. 2, optimized for RL in the 0 m phantom position, according to one or more embodiments;

DETAILED DESCRIPTION

Figure 1:
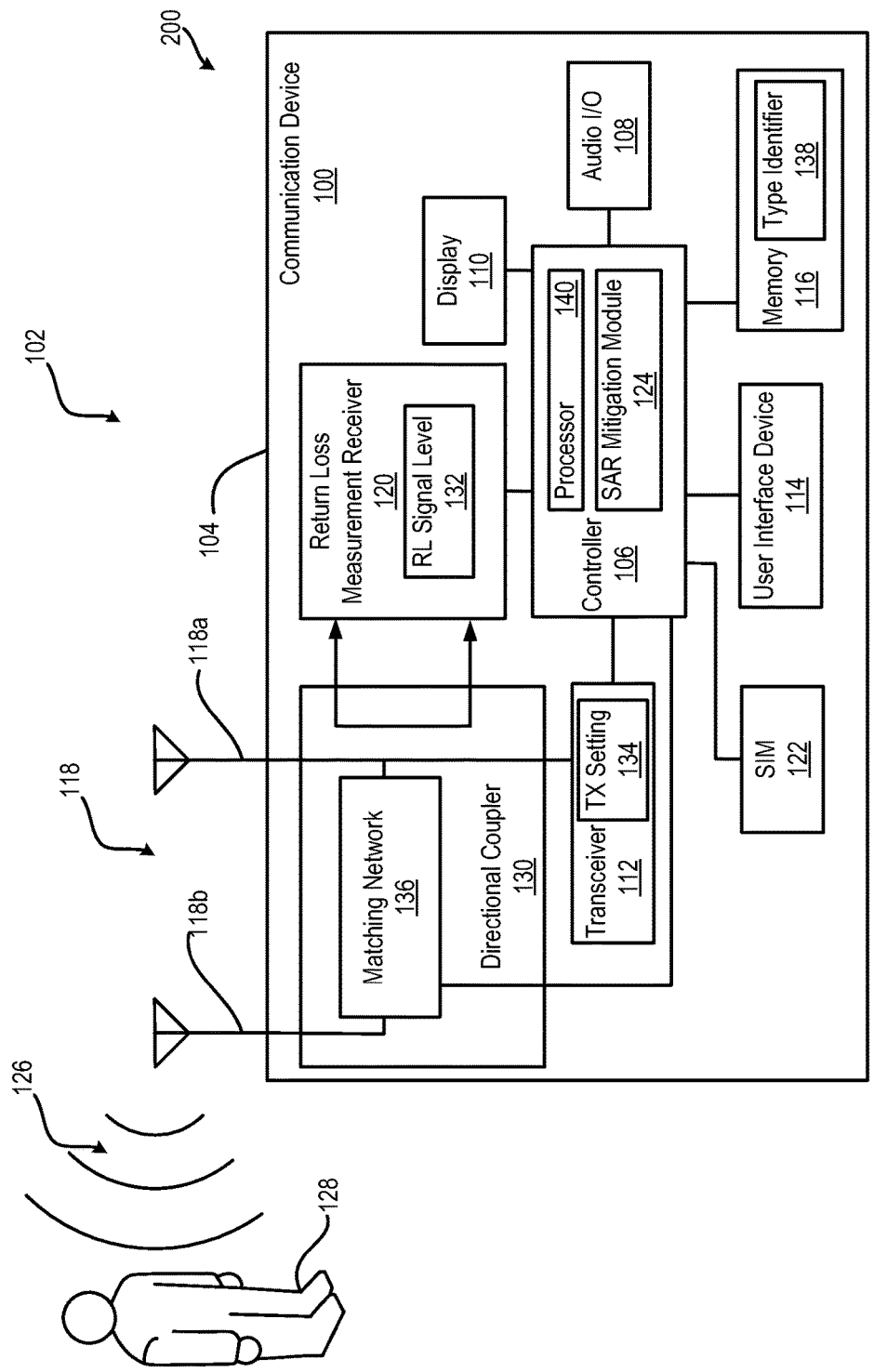
FIG. 1 illustrates a block diagram of a communication device having a Return Loss (RL) measurement receiver for mitigating Specific Absorption Rate (SAR) exposure to a user, according to one or more embodiments.

The present innovation provides a method, communication device, and computer program product for mitigating Specific Absorption Rating (SAR) exposure to a user who is proximate to a communication device. The method includes an on-device measurement receiver of a communication device detecting a first signal level corresponding to power delivered to a first antenna. The method includes a controller determining a first return loss value based on a first transmit power setting and the first signal level. The method includes the controller determining whether the first return loss value differs from a baseline value by a threshold amount. In response to the controller determining that the first return loss value differs by the threshold amount, the controller causes the communication device to reduce the power delivered to the first antenna.

The communication device includes a first antenna, a transceiver in communication with the first antenna and which delivers power to at least the first antenna, and an on-device measurement receiver that detects a first signal level that corresponds to the power delivered to a first antenna. A controller is in communication with the transceiver and the on-device measurement receiver. The controller compares a first transmit power setting to the first signal level to determine a first return loss value. The controller determines whether the first return loss value differs from a baseline value by a threshold amount that indicates an exceedance of a SAR. In response to the controller determining that the first return loss value differs by the threshold amount, the controller reduces the power delivered to the first antenna by the transceiver.

The program product includes a controller-readable storage device having stored thereon program code that, when executed, configures a controller of a communication device having at least first antenna. The controller is in communication with a transceiver that provides power to the first antenna and with an on-device measurement receiver. The program code configures the controller to perform executable operations comprising: (a) receiving from the on-device measurement receiver, a first signal level that is detected by the on-device measurement receiver and which corresponds to power delivered to a first antenna; (b) comparing a first transmit power setting to the first signal level to determine a first return loss value; (c) determining whether the first return loss value differs from a baseline value by a threshold amount that indicates an exceedance of a SAR; and (d) in response to determining that the first return loss value differs by the threshold amount, reducing the power delivered to the first antenna.

For adaptive impedance matching purposes the capacitive sensors are being replaced by a more accurate measurement receiver method of detecting antenna impedance changes. The measurement receiver can directly measure the signals going into and out of the antenna to more accurately determine Total Radiated transmit Power (TRP) and Total Integrated Sensitivity (TIS). The present innovation completely eliminates the capacitive sensor and provides an alternative method of detecting the body-worn position, for purposes of reducing the transmit power such that the SAR does not exceed regulatory limits. Aspects of the disclosure capitalizes on the fact that newer transceiver devices have the ability to measure input and reflected signal levels at the matching circuit input.

The present innovation uses a measurement receiver to detect and correct for high SAR. In addition, the same measurement receiver is used for adaptive antenna impedance matching. In this way, the communication device can have low SAR and good TIS and TRP, and the communication device uses a single measurement receiver for both functions, which reduces cost and complexity. A controller of the communication device can use the measurement receiver to detect a return loss exceeding return loss threshold for SAR. If the return loss threshold for SAR is exceeded then the transmitted power is reduced. The transmitted power can be reduced either in the conventional way, by reducing the signal power from the transceiver into the antenna matching circuit, or by controlling the antenna matching circuit to reduce the power delivered into the antenna. In this way the measurement receiver can be used to detect various levels of antenna impedance mismatch. At lower threshold levels, the impedance matching circuit can be controlled to improve the TRP or TIS. And at higher threshold levels, power reduction measures can be employed to reduce SAR. The power reduction measures can include reducing power from the transceiver into the adaptive impedance matching circuit and controlling the adaptive impedance matching circuit to reduce the power delivered to the antenna. In this way, the device can employ a single measurement receiver apparatus for SAR reduction and adaptive antenna impedance matching, thereby eliminating a separate capacitive sensor.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific components, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein.

Turning now to FIG. 1, there is depicted a block diagram representation of an example communication device 100 within which several of the features of the disclosure can be implemented. The communication device 100 can be one of a host of different types of devices, including but not limited to, a mobile cellular phone or smart-phone, a laptop, a net-book, an ultra-book, a networked smart watch or networked sports/exercise watch, and/or a tablet computing device or similar device that can include wireless communication functionality. As a device supporting wireless communication, communication device 100 can be one of, and also be referred to as, a system, device, subscriber unit, subscriber station, mobile station (MS), mobile, mobile device, remote station, remote terminal, user terminal, terminal, communication device, user agent, user device, cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. These various devices all provide and/or include the necessary hardware and software to support the various wireless or wired communication functions as part of a communication system 102. The communication device 100 can also be an over-the-air link in the communication system 102 that can be intended to be portable or hand-held or for which a user can move into close proximity. Examples of such communication devices include a wireless modem, an access point, a repeater, a wirelessly-enabled kiosk or appliance, a femtocell, a small coverage area node, and a wireless sensor, etc.

In one or more embodiments, the communication device 100 can include a housing 104, within which can be located a controller 106, audio input and output (I/O) component 108, a display 110, a transceiver 112, a user interface device 114, a memory 116, one or more antennas 118 and the transceiver 112, and a removable subscriber module (SIM) 122 coupled to the controller 106. The communication device 100 can include a SAR mitigation module 124 coupled to the controller 106. In alternate embodiments, the SAR mitigation module 124 can reside within the controller 106, can reside within the memory 116, can be autonomous modules, can be software, can be hardware, programmable logic, or can be in any other format useful for a module on a wireless communication device 100. The SAR mitigation module 124 can be an application or set of instructions stored in memory 116 and executed within a processor 140 of the controller 106.

The display 110 can be a liquid crystal display (LCD), a light emitting diode (LED) display, a plasma display, or any other means for displaying information. The transceiver 112 may include a transmitter and/or a receiver. The audio input and output circuitry 108 can include a microphone, a speaker, a transducer, or any other audio input and output circuitry. The user interface device 114 can include a keypad, buttons, a touch pad, a joystick, an additional display, or any other device useful for providing an interface between a user and an electronic device. The memory 116 may include a random access memory, flash memory, a read only memory, an optical memory or any other memory that can be coupled to a wireless communication device.

In one or more embodiments, the communication device 100 includes one antenna 118a that transmits a transmit signal 126 for which SAR mitigation for a user 128 is achieved through use of a return loss (RL) measurement receiver 120. The transceiver 112 is in communication with the first antenna 118a and delivers power to at least the first antenna 118a. A directional coupler 130 can be communicatively coupled between the first antenna 118a and the transceiver 112 to provide for two way communication over the first antenna 118a. The device 100 includes an on-device measurement receiver that detects a first signal level 132 that corresponds to the power delivered to a first antenna. The controller 106 is in communication with the transceiver 112 and the on-device RL measurement receiver 120. The controller 106 compares a first transmit power setting 134 to the first signal level 132 to determine a first return loss value. The controller 106 determines whether the first return loss value differs from a baseline value by a threshold amount that indicates an exceedance of a SAR. In response to the controller 106 determining that the first return loss value differs by the threshold amount, the controller 106 reduces the power delivered to the first antenna 118a by the transceiver 112. For example, the controller 106 can reduce an output power level of the transceiver 112 by changing the transmit power setting 134 to reduce the power delivered to the first antenna 118a. For another example, the controller 106 can detune the impedance matching network 136 to reduce power delivered to the first antenna 118a.

In one or more embodiments, the controller 106 can determine a type identifier 138 for the communication device 100, such as from data stored in memory 116. The controller 106 can determine the threshold difference of return loss associated with the type identifier 138.

In one or more embodiments, the communication device 100 includes at least two antennas 118, e.g., first antenna 118a and second antenna 118b, that each transmits a portion of a transmit signal 126 as selectably apportioned by an impedance matching network 136. Transmitting on two or more antennas 118 can support spatial diversity, SAR mitigation, etc. The RL measurement receiver 120 can be used to measure the return loss for the at least two antennas 118 for SAR mitigation for the user 128. The on-device RL measurement receiver 120 can further detect a second signal level 132 that corresponds to power delivered to the second antenna 118b of the communication device 100. The controller 106 compares a second transmit power setting 134 to the second signal level to determine a second return loss value. The controller 106 can shift power delivered respectively between the first and second antennas 118a, 118b based at least in part on adaptive antenna impedance matching of the first and second return loss values. The controller 106 determines whether either of the first or second return loss values differs from its respective baseline value by a respective threshold amount that indicates an exceedance of SAR. In response to the controller 106 determining that either of the first or second return loss values differs by the respective threshold amount, the controller 106 reduces the power delivered to the respective first or second antenna 118a, 118b. For example, the controller 106 can reduce an output power level of the transceiver 112 by changing the transmit power setting 134 to reduce the power delivered to either or both of the first and second antennas 118a, 118b. As another example, the controller 106 can detune the impedance matching network 136 to reduce power delivered to either or both of the first and second antennas 118a, 118b.

An investigation has shown that the measurement receiver 120 can be an effective source for detecting SAR exposure.

The investigation explored matching circuit design considerations that enable these signal measurements to replace user position sensors. In particular, the investigation focused on RL measurements. The correct definition of RL is the ratio, in dB units, of the input power to the reflected power, resulting in a positive number. For clarity, positive return loss is used by default. However, conventionally, return loss is expressed as a negative number. The ratio of reflected to incident power results in the negative RL. Hereafter, an apostrophe is used to indicate negative RL.

$$RL(\text{dB}) = 10*\text{Log}_{10}[P_{INPUT}/P_{REFLECTED}]$$

$$RL'(\text{dB}) = \text{negative return loss}$$
$$= 10*\text{Log}_{10}[P_{REFLECTED}/P_{INPUT}]$$

There are two effects that cause a change in RL when the device is placed in a body-worn position. Firstly, when a lossy body comes in close proximity to the antenna, the RL of the antenna tends to go up, which can be referred to as the body dissipation effect. Secondly, if the antenna is driven via a well-designed matching circuit, there is a countervailing tendency for the RL to go down, especially if the bandwidth is narrow, which can be referred to as the mismatch effect. The mismatch effect only causes the RL to go down if the matching circuit is designed for maximum return loss in a non-body-worn position such as free space. Adjusting the design for maximum return loss in the body-worn position causes the RL to go up. In this way, when the device is moved to the body-worn position, the design can make both effects, the dissipation and mismatch effects, move the RL in the same direction.

Designing for maximum RL in a body worn position can be helpful for achieving good overall field performance with varying user positions for frequency division duplex (FDD) operation with the receive frequency higher than the transmit frequency. This is because the RL maximum in Free Space (FS) or light hand grip positions tends to be at higher operating frequency, and the RL maximum in user positions with more antenna loading, such as BHH, tends to be at lower operating frequency. Advantageously, the light hand grip and FS positions are more likely to occur in standby operation when receive performance is more important. For a few FDD band pairs, such as the $3^{rd}$ generation partnership program (3GPP) band 13 and band 20, the receive frequencies are below the transmit frequencies. In these bands it can be better for overall field performance to design for maximum RL in the FS or light hand grip position. For these bands when the device is moved to the body-worn position the mismatch effect would typically cause the RL to go down (despite a countervailing dissipation effect). Thus, when the controller 106 determines whether the first return loss value differs from a baseline value by a threshold amount that indicates an exceedance of a SAR, the threshold amount can be either a positive or a negative threshold amount, depending on the band of operation.

In particular, the investigation procedure for determining feasibility of RL as a body-worn position indicator included using a main Dual Inverted "L" Antenna (DILA) antenna data and matching circuit design tool from a representative mobile device design. The specifics of the antenna are not relevant since other comparable antennas are expected to have similar behavior. To demonstrate the general effectiveness of RF return loss measurements for detecting body-worn positions, the investigation addresses three matching circuit designs. First, the investigation concerned Design 1, which is a matching circuit optimized for TX and RX performance without any consideration given to RL behavior. Second, the investigation concerned a matching circuit of Design 2 having the tuning states adjusted to maximize RL on the 10 mm slab position. Third, the investigation concerned a matching circuit of Design 3 having the tuning states adjusted to maximize RL on the 0 mm slab position.

Figure 2:
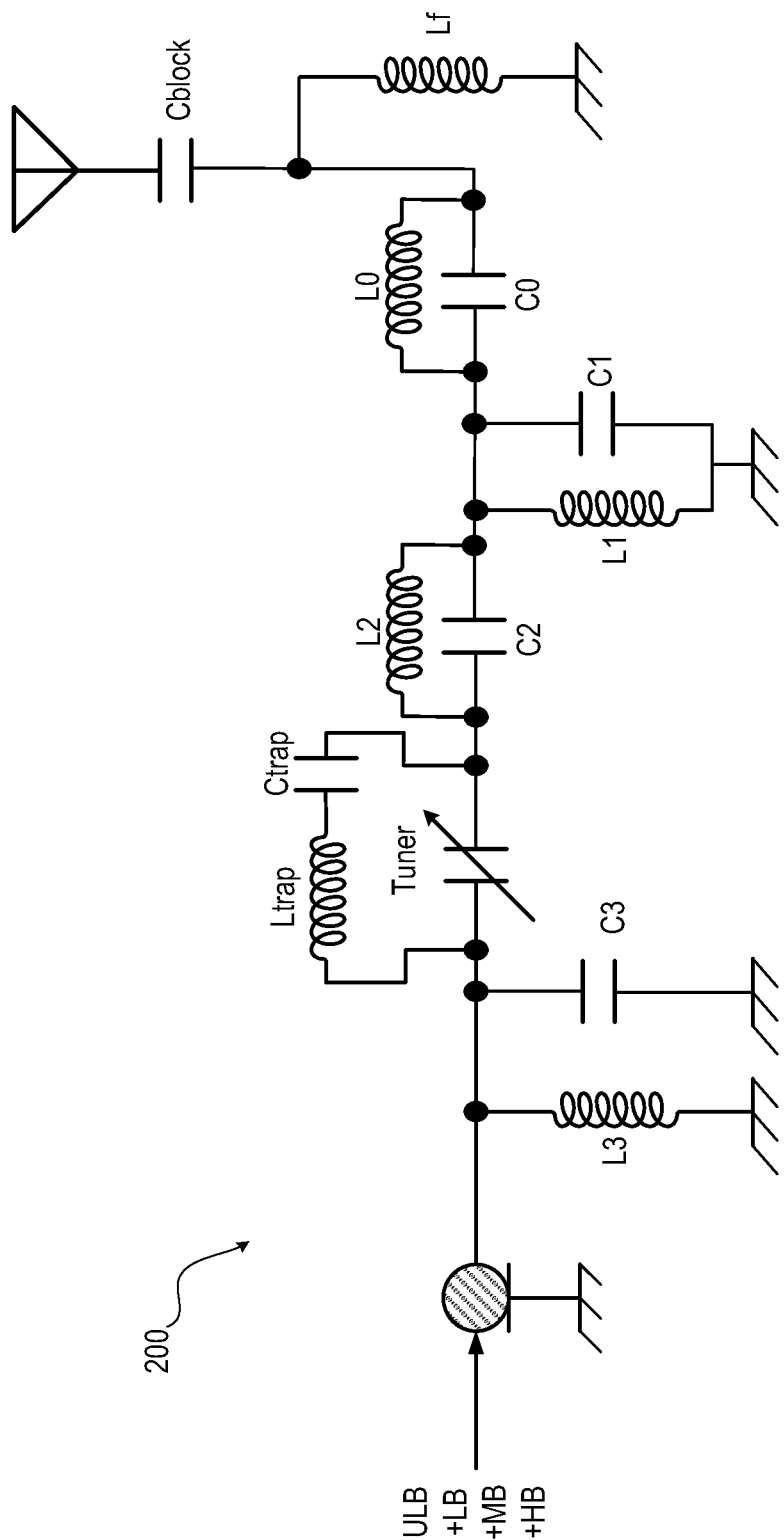
FIG. 2 illustrates a circuit schematic of a single port antenna matching circuit design, according to one or more embodiments.

FIG. 2 illustrates a matching circuit 200 designed to maximize transmit and receive performance with regard to RL behavior. In particular, FIG. 2 illustrates a single port antenna matching circuit topology. The matching circuit comprises a plurality of fixed inductors and capacitors, including single tunable capacitor. The design uses a barium strontium titanate tunable capacitor with the tuning voltages restricted to the 3.5-22 V, however other suitable tunable capacitor technology can be employed such as those employing silicon on insulator (SOI), or micro-electromechanical switch (MEMS) integrated circuits. The fixed inductance and capacitor values are set to fixed values in the design of the matching circuit, and the tunable capacitor can be programmed to a tunable capacitor value during operation. The programmable capacitor value can be programmed as a function of operating frequency. In this way, an antenna can be employed over a wide range of operating frequency, while the bandwidth of the antenna and matching circuit in any of the programming states is relatively narrow. The programmable capacitor can also be programmed as function of operating condition. The operating condition can be inferred from sensors, such as return loss sensors. Thus, when the controller 106 determines whether the first return loss value differs from a baseline value by a threshold amount that indicates an exceedance of a SAR, the tunable capacitor value can be changed such that the SAR is reduced.

Figure 4A:
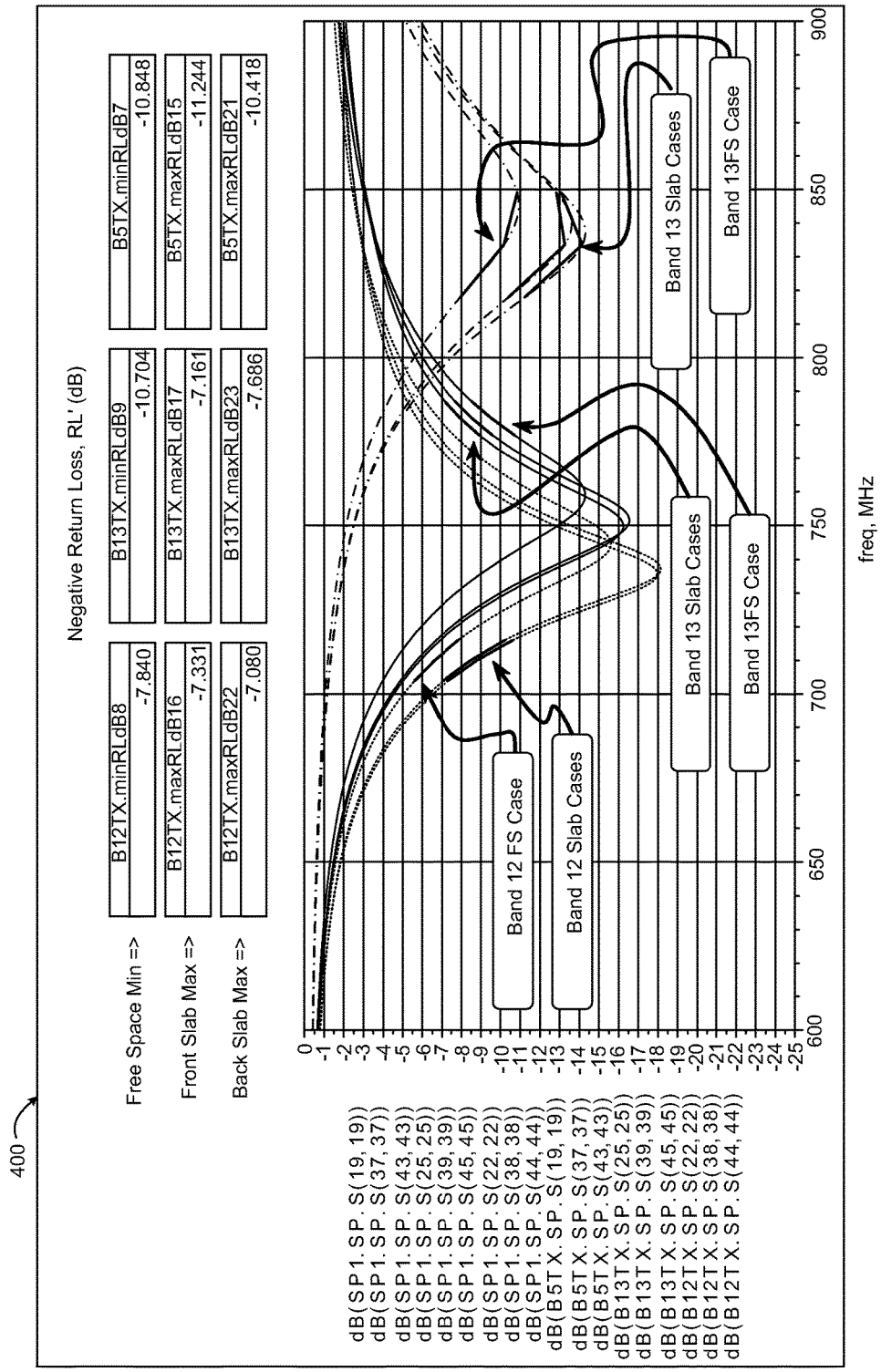
FIGS. 4A-4B illustrate graphical plots respectively of a low band and a high band of a return loss calculations for a first antenna matching circuit design, in the free space and 10 mm slab positions, according to one or more embodiments.
Figure 4B:
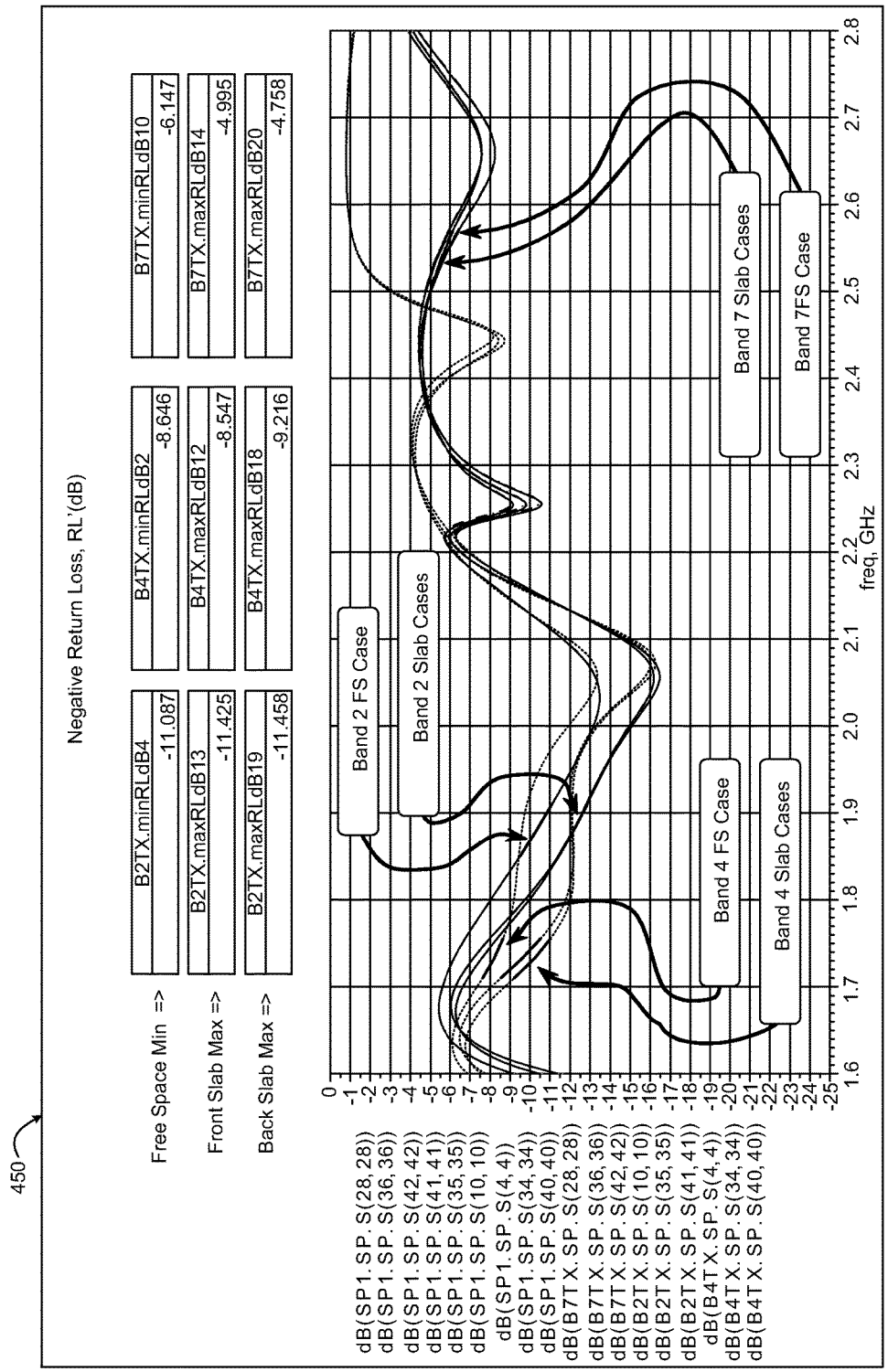
Figure 5A:
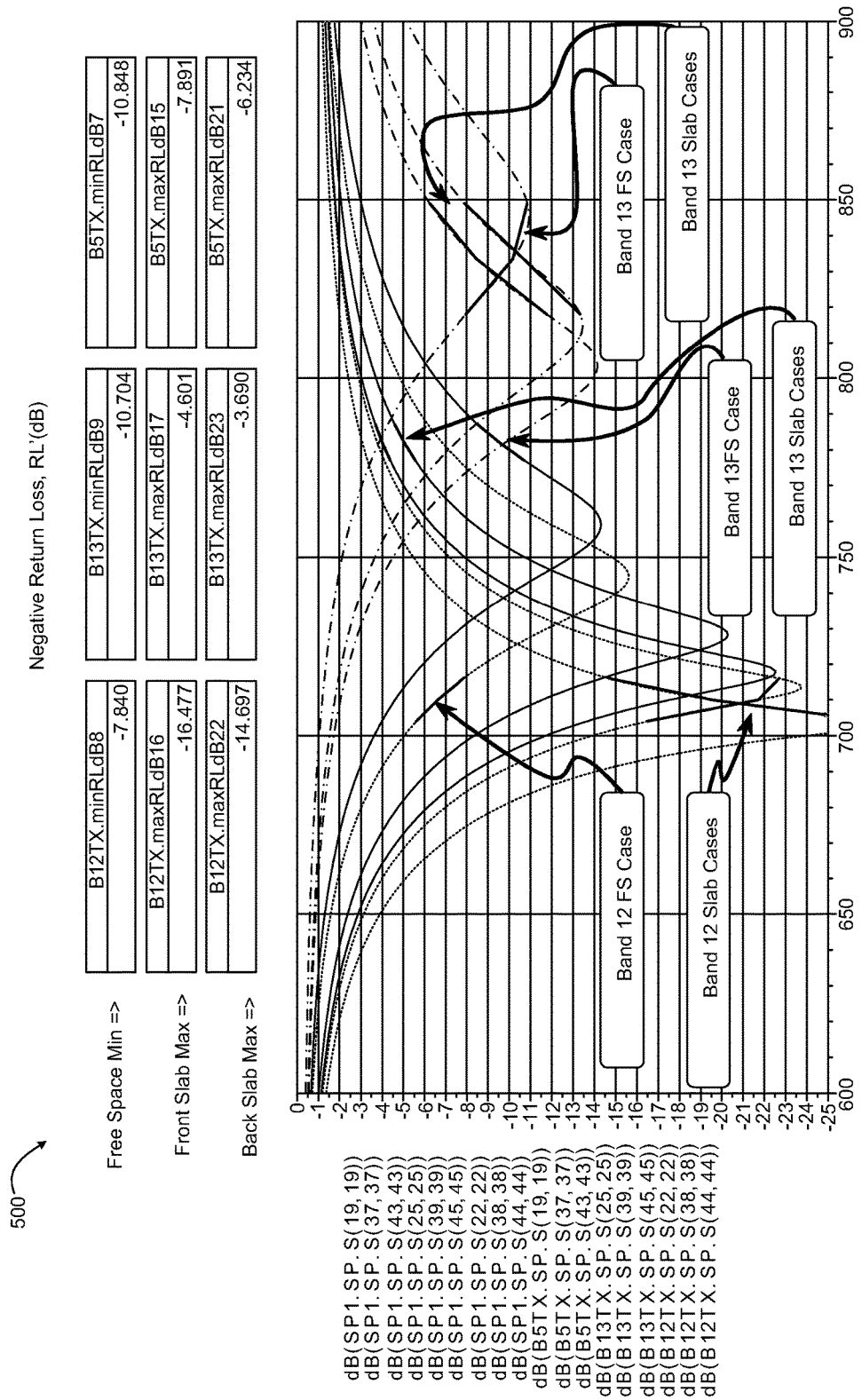
FIGS. 5A-5B illustrate graphical plots respectively of a low band and a high band of a return loss calculations for a first antenna matching circuit design, in the free space and 0 mm slab positions, according to one or more embodiments.
Figure 5B:
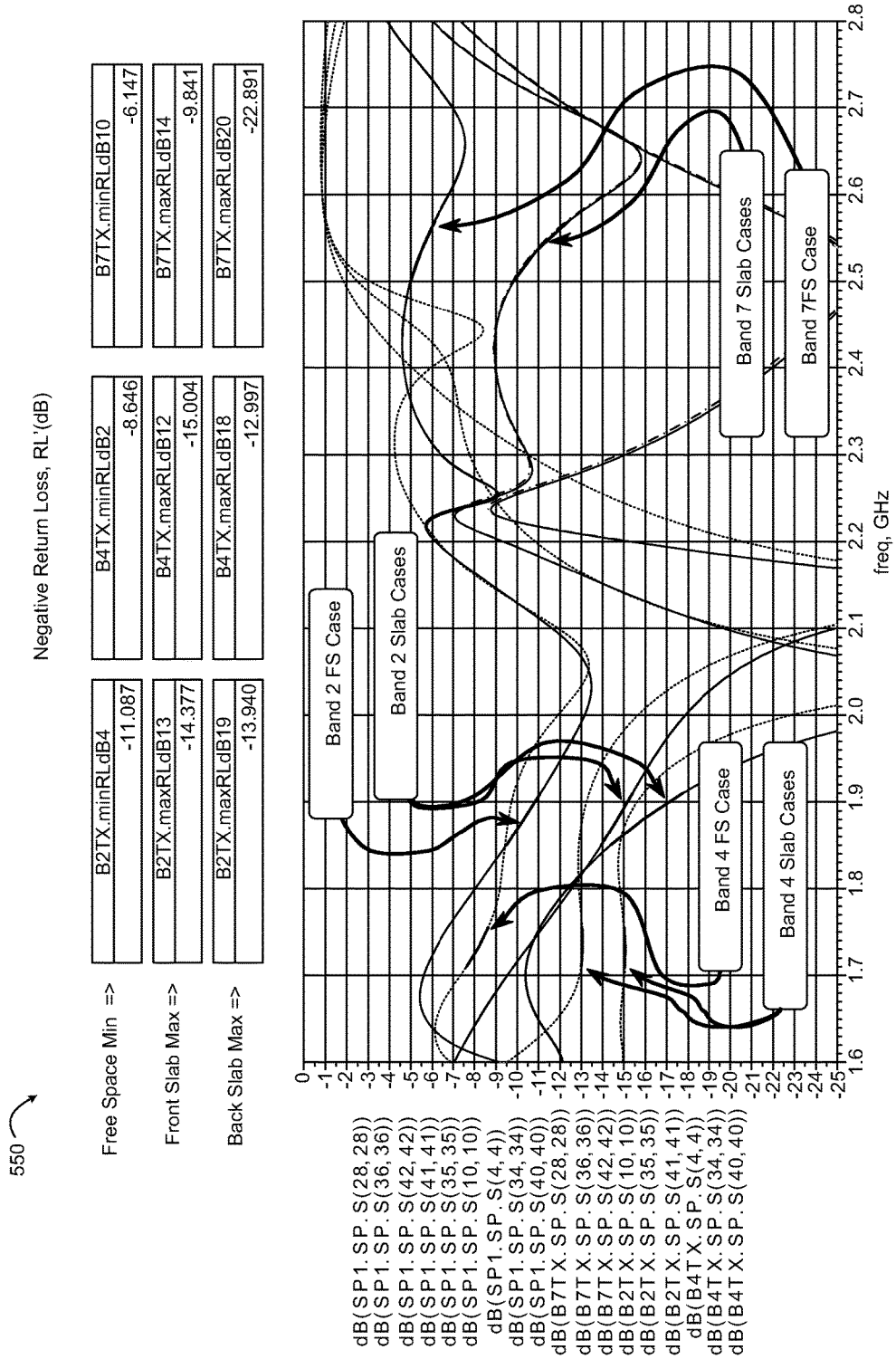

For a Design 1 of matching circuit 200, the Gmatch of the matching circuit is maximized without regard for return loss. Gmatch refers to the power delivered to the antenna. There are several ways to simulate Gmatch: A first method is to calculate the scalar gain, /S21/, of the matching circuit with the load impedance referenced to the antenna impedance. Another method is to simulate the design with ideal directional couplers and calculate the forward power into the antenna minus the reflected power. The free space performance of a representative DILA and matching circuit Design 1 is summarized in TABLE 1 of FIG. 3. These results are determined by entering transceiver data, and antenna radiation efficiency into a transceiver lineup calculator. The lineup calculator determines the required Gmatch, i.e. the Gmatch Target, to meet Total Radiated transmit Power (TRP) and Total Integrated Sensitivity (TIS) requirements for each band. Inspection of FIG. 3 indicates that the Gmatch performance is generally meeting the lineup calculator targets. Next, RL is calculated for the front and back 10 mm slab antenna positions and compared to the RL in the FS position. These calculations are presented in graphical plots 400, 450 and tabular forms respectively in FIGS. 4A-4B. Similarly, in FIGS. 5A-5B, RL is presented in graphical plots 500, 550 respectively for the front and back 0 mm slab antenna positions and compared to the RL in the FS position. The RL data in FIGS. 4A-4B and FIGS. 5A-5B are for inspection whether RL is a suitable indicator of the 5 mm and 0 mm phantom positions, respectively. The investigation includes determining whether an RL threshold can be defined that is higher than the maximum RL levels in free space and lower than the minimum RL levels, in the front and back 5 mm slab cases. Referring to graphical plots 400,

450 of FIGS. 4A-4B, a conclusion can be drawn that for design 1 there are only four body-worn cases in which the minimum RL is higher than the maximum FS RL: B5 Transmit (Tx) Front Slab, B2 Tx Front Slab, B2 Tx Back Slab, and B4 Tx Back Slab. Thus for Design 1, it is generally not possible, except in a few cases, to use RL measurements for detecting the 5 mm slab positions. Next, the investigation looks at the RL performance of Design 1 for the 0 mm slab position. Referring to 500, 550 of FIGS. 5A-5B, a conclusion can be drawn that for design 1 there are eight (out of twelve) body-worn cases in which the minimum RL is higher than the maximum FS RL: B12 Tx Front and Back Slab, B4 Tx Front and Back Slab, B2 Tx Front and Back Slab, and B7 Tx Front and Back Slab. Thus for Design 1, RL could be a suitable indicator for detecting the 0 mm slab positions for bands 12, 4, 2 and 7, but not for bands 13 and 5.

Figure 7A:
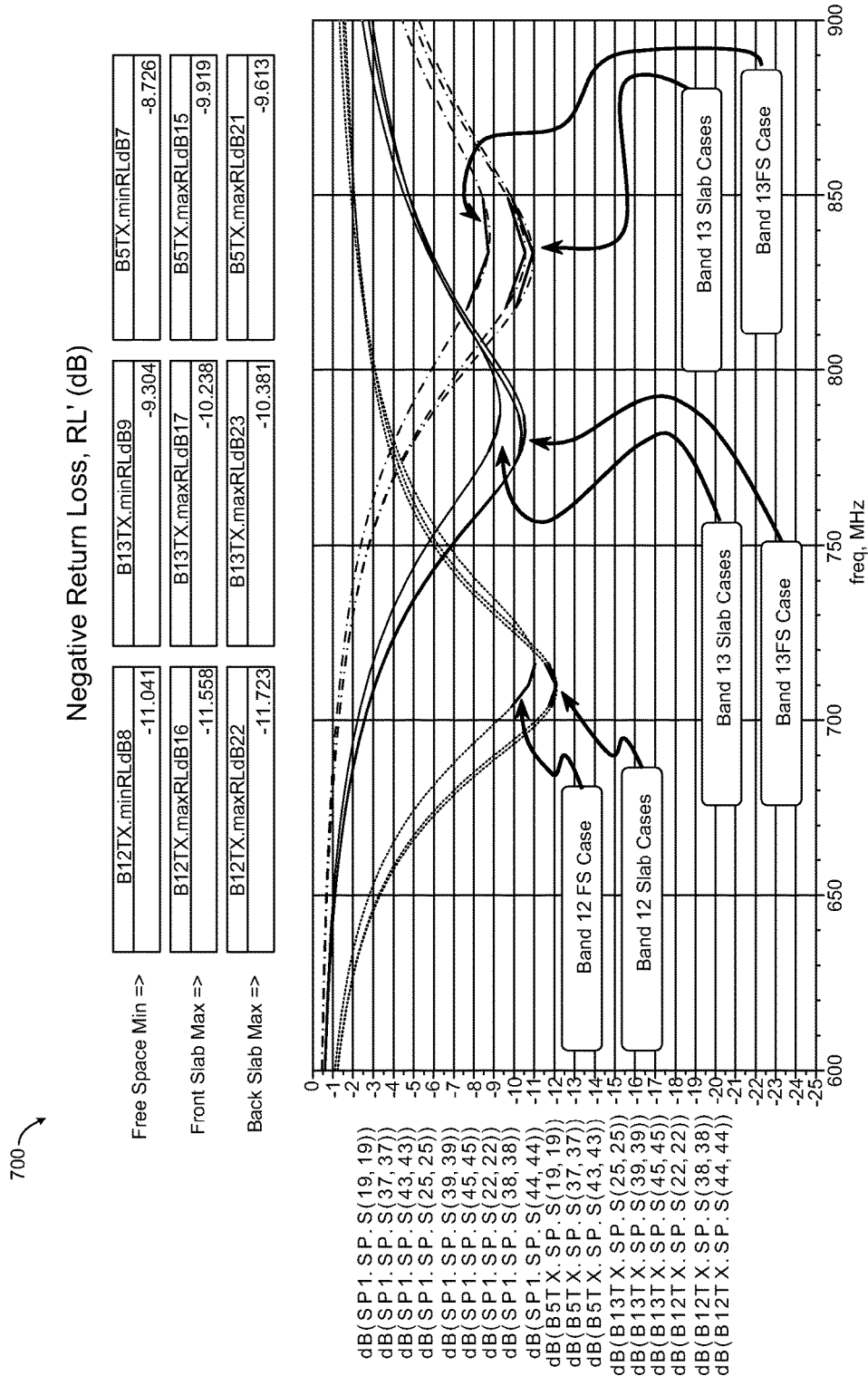
Figure 7B:
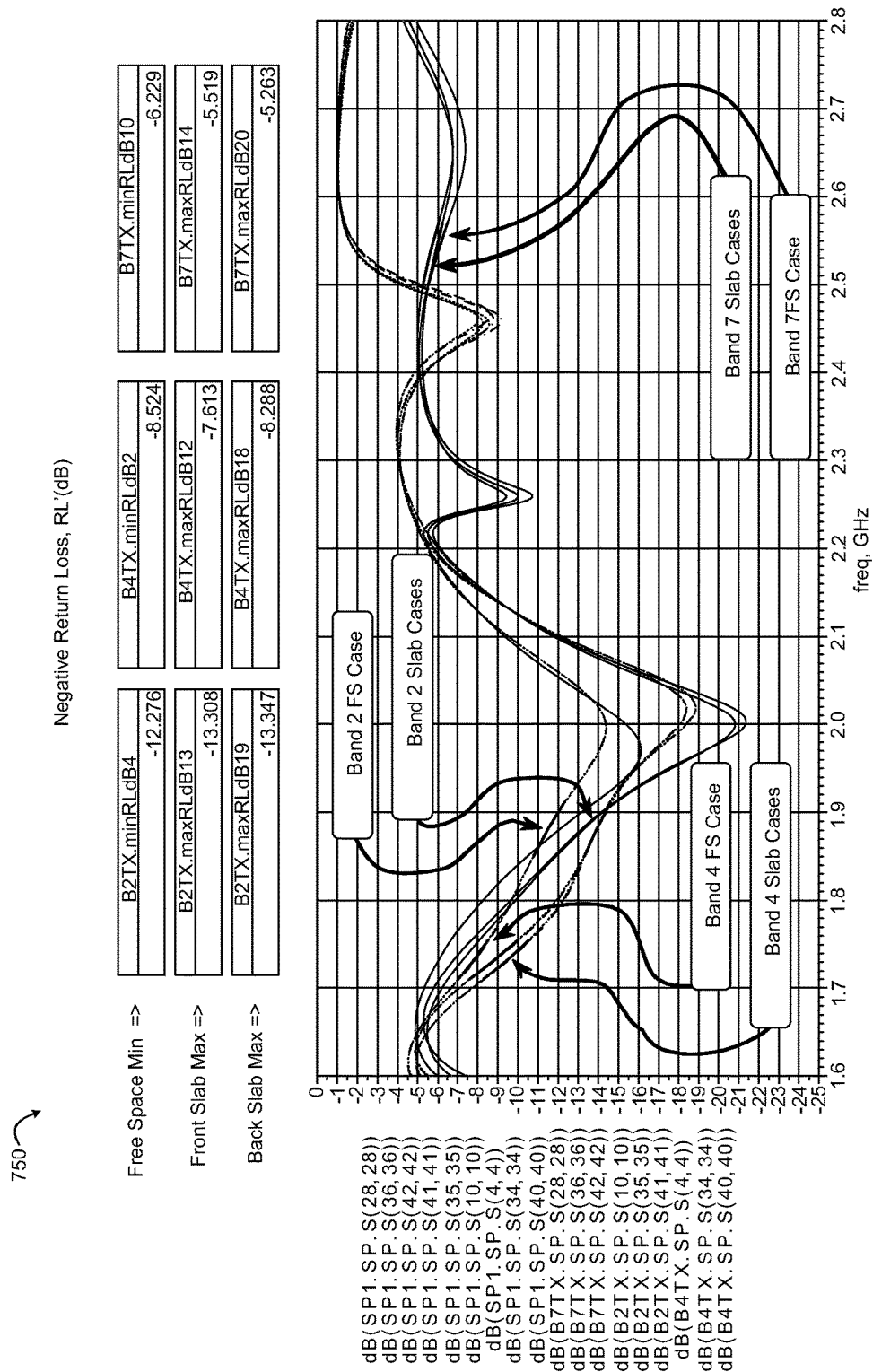
Figure 8A:
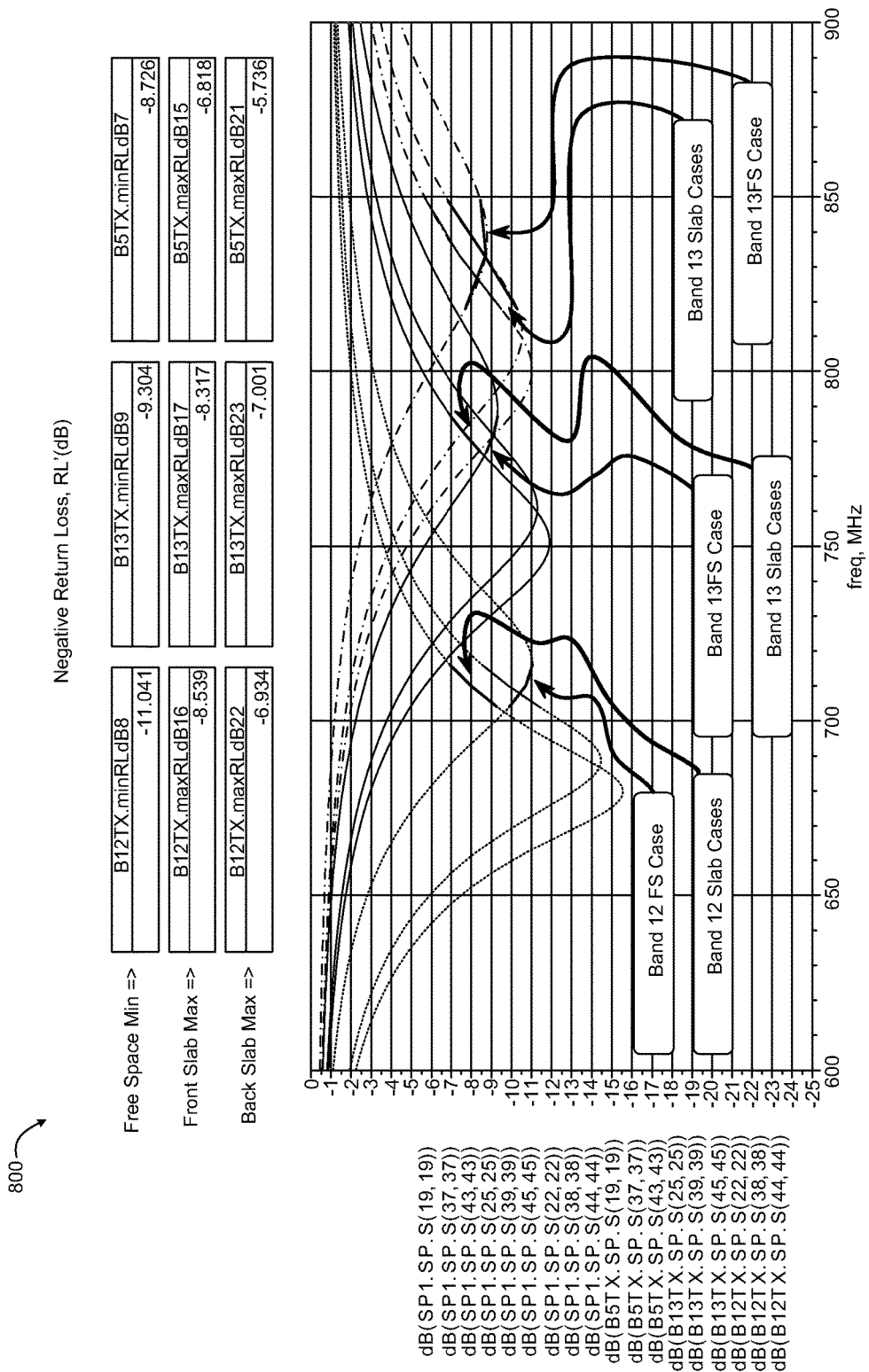
Figure 8B:
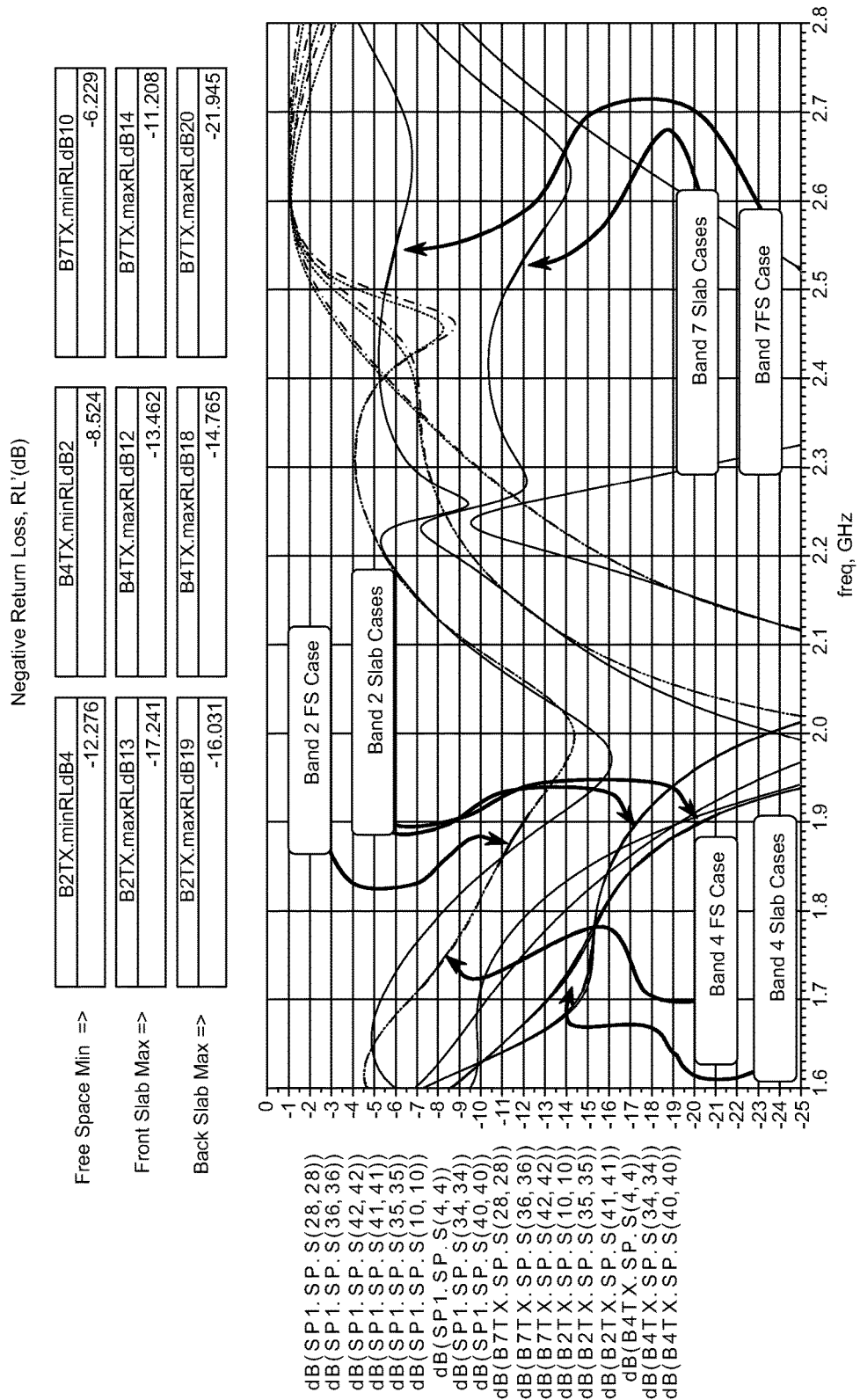

The investigation then continues to Design 2 for a matching circuit adjusted to maximize RL in the 10 mm slab position. Design 2 employs the same single port antenna matching circuit topology of FIG. 2 with the same simulation schematic as Design 1 with all components optimized with the tuning voltages restricted to the 3.5-22 V range. In addition, the tuners are re-optimized to maximize RL in the 10 mm slab position. The free space Tx and Rx Gmatch performance for Design 2 are summarized in TABLE 2 in FIG. 6, which indicates that the Gmatch performance is generally meeting the lineup calculator targets. By comparing the free space Gmatch performance of Design 2 in TABLE 2 (FIG. 6) to the performance of Design 1 in TABLE 1 (FIG. 3), the investigation indicates that the Gmatch performance is nearly the same, despite having adjusted Design 2 for RL performance in the 10 mm slab position. Next, RL is calculated for the front and back 10 mm slab antenna positions and compared to the RL in the FS position. These calculations are presented in graphical plots 700, 750 and tabular forms in FIGS. 7A-7B. Similarly, in graphical plots 800, 850 of FIGS. 8A-8B, RL is presented for the front and back 0 mm slab antenna positions and compared to the RL in the FS position. The RL data in graphical plots 700, 750, 800, 850 respectively FIGS. 7 A-7B and FIGS. 8-8B are for inspection whether RL is a suitable indicator of the 10 mm and 0 mm slab positions, respectively. There are six (out of twelve) body-worn cases in which the min RL is higher than the maximum FS RL: B12 Tx Front and Back Slab, B2 Tx Front and Back Slab, and B7 Tx Front and Back Slab. Thus for Design 2, RL could be a suitable indicator for detecting the 10 mm slab positions for all of the low bands.

The investigation then continues to Design 3 for a matching circuit adjusted to maximize RL in the 0 mm positions. The free space Tx and Rx Gmatch performance for Design 3 is summarized in TABLE 3 provided in FIG. 9.

By comparing the free space Gmatch performance of Design 3 in TABLE 3 (FIG. 9) to Design 2 in TABLE 2 (FIG. 6) and Design 1 in TABLE 1 (FIG. 3), the investigation indicates that the Gmatch performance is slightly degraded in the low bands, and marginal failures have been introduced in Bands 13 and 5. The reason for the degradation is that the 0 mm slab has a greater loading effect on the antenna. This loading effect causes a larger shift in the peaking of RL versus frequency curves, toward lower frequencies. Thus, for the lesser loaded cases such as FS, the RL versus frequency peak is shifted higher. This is caused by maximizing the RL in the 0 mm slab case. An explanation for the slight Gmatch degradation is that the Gmatch versus frequency peak approximately follows the RL versus frequency peak. Changing from the free space antenna impedance to the slab antenna impedance causes the Gmatch and RL peaks to shift lower in frequency. In design 3 the tuners were adjusted so that the peaks are shifted back (higher) to the Tx band frequencies for the 0 mm slab case. However the Gmatch peaks in the free space case are shifted above the Tx band. As with Designs 1 and 2, the RL is calculated for to determine if RL is a suitable indicator of the 10 mm slab position for Design 3. There are only two (out of twelve) body-worn cases in which the minimum RL is higher than the maximum FS RL: the B2 Tx Front and Back Slab cases. Thus for Design 3, RL is a suitable indicator for detecting the 10 mm slab positions except for the band 2 cases.

Figure 10A:
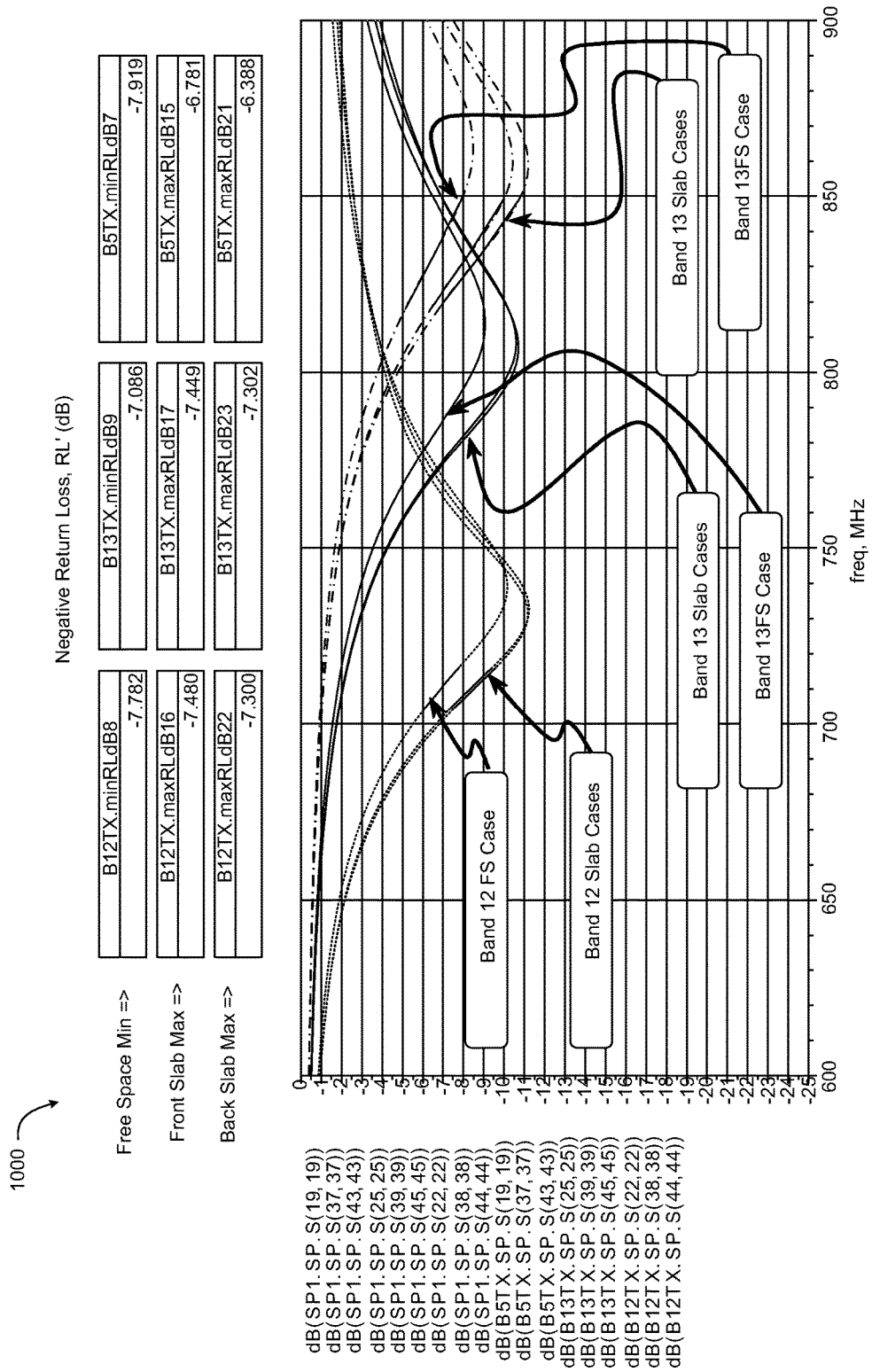
FIGS. 10A-10B illustrate graphical plots respectively of a low band and a high band of a return loss calculations for a third antenna matching circuit design, in the free space and 10 mm slab positions, according to one or more embodiments.
Figure 10B:
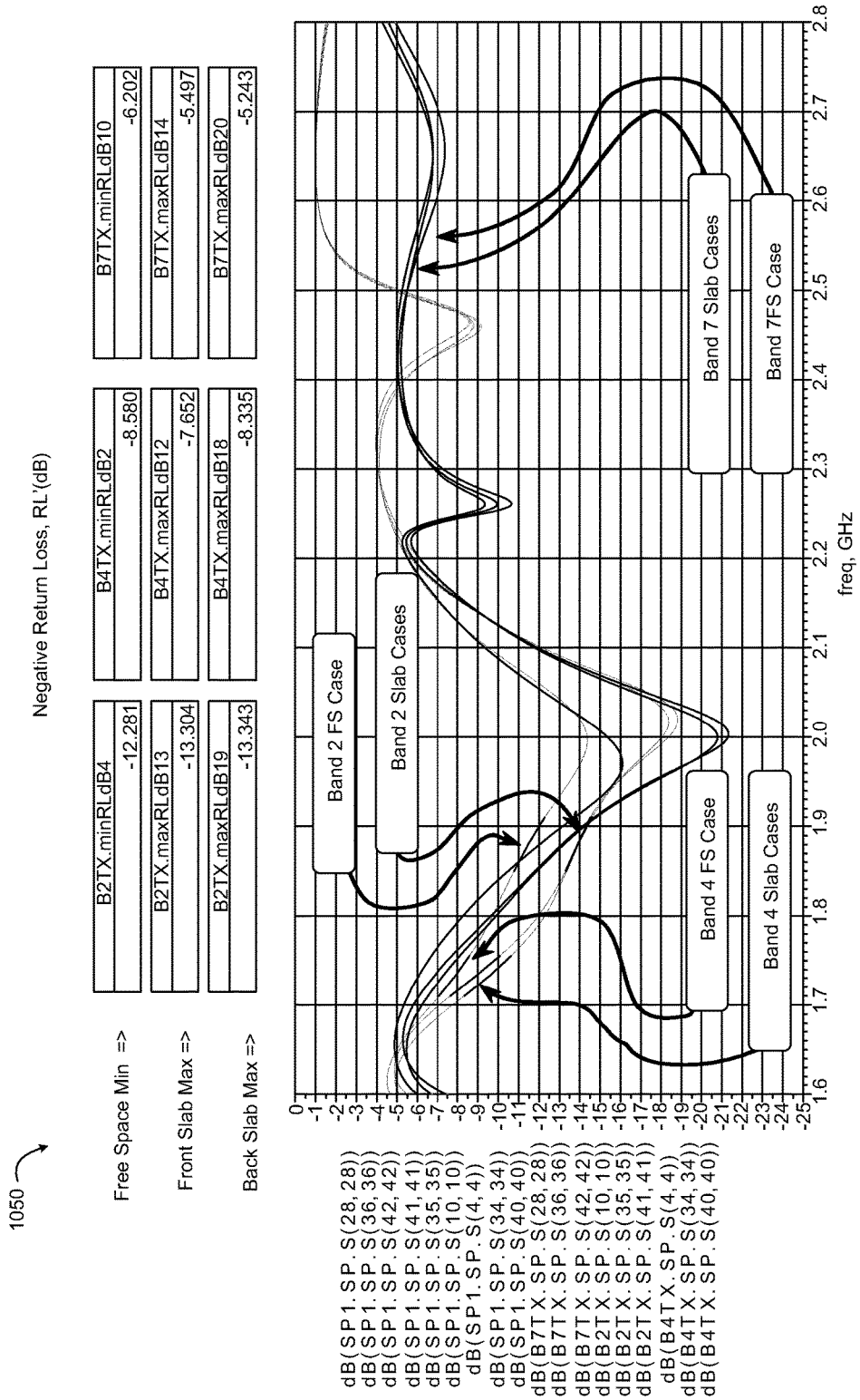

As with the previous designs, the RL is calculated for the front and back 10 mm slab antenna positions and compared to the RL in the FS position. These calculations are presented in graphical plots 1000, 1050 and tabular forms respectively in FIGS. 10A-10B. From FIGS. 10 A-10B, for the 10 mm slab positions, there are only two (out of twelve) body-worn cases in which the min RL is higher than the max FS RL: the B2 Tx Front and Back Slab cases. So, for design 3, RL is not suitable indicator for detecting the 10 mm slab positions except for the band 2 cases.

Figure 11A:
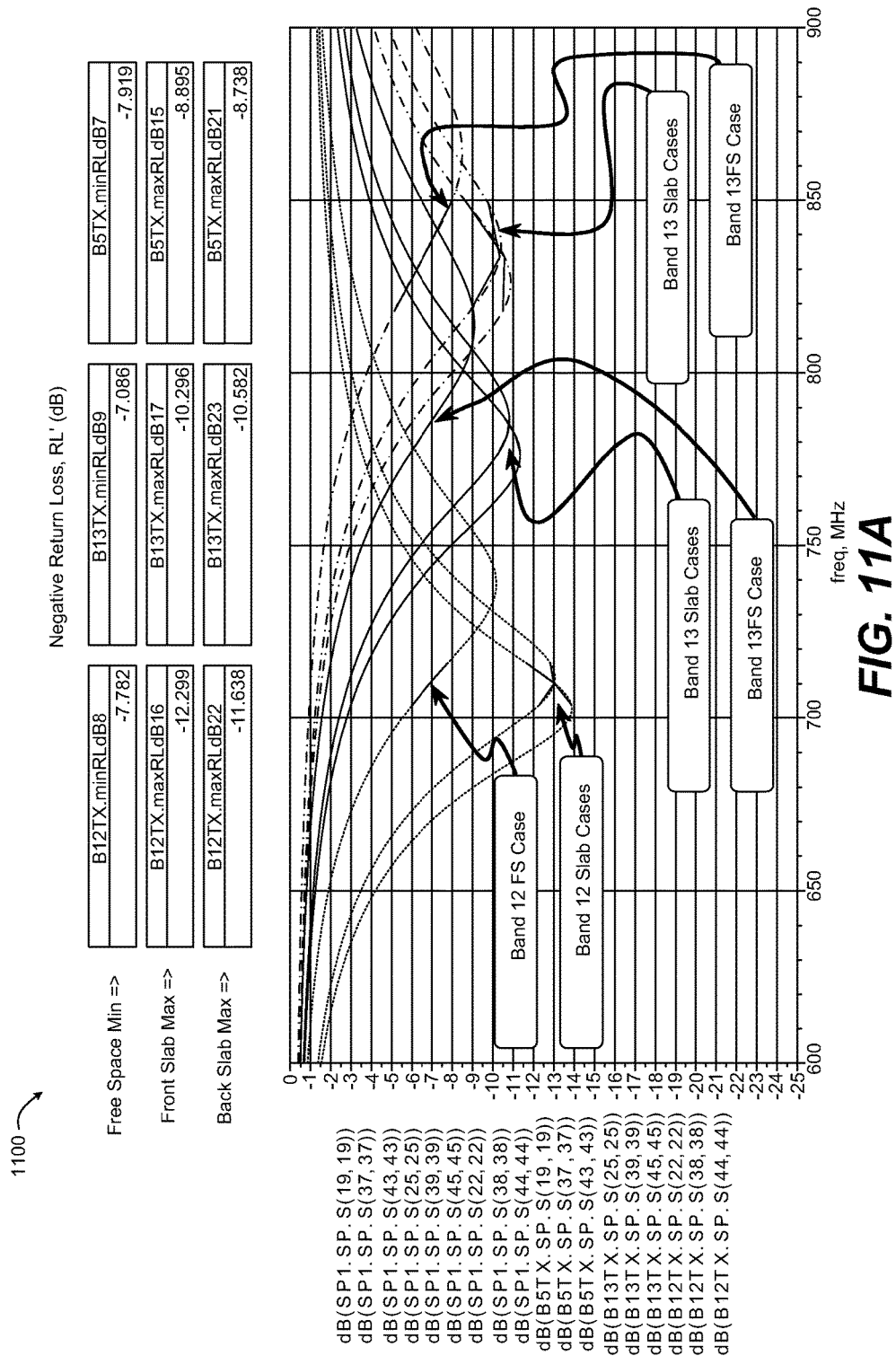
FIGS. 11A-11B illustrate graphical plots respectively of a low band and a high band of a return loss calculations for a third antenna matching circuit design, in the free space and 0 mm slab positions, according to one or more embodiments.
Figure 11B:
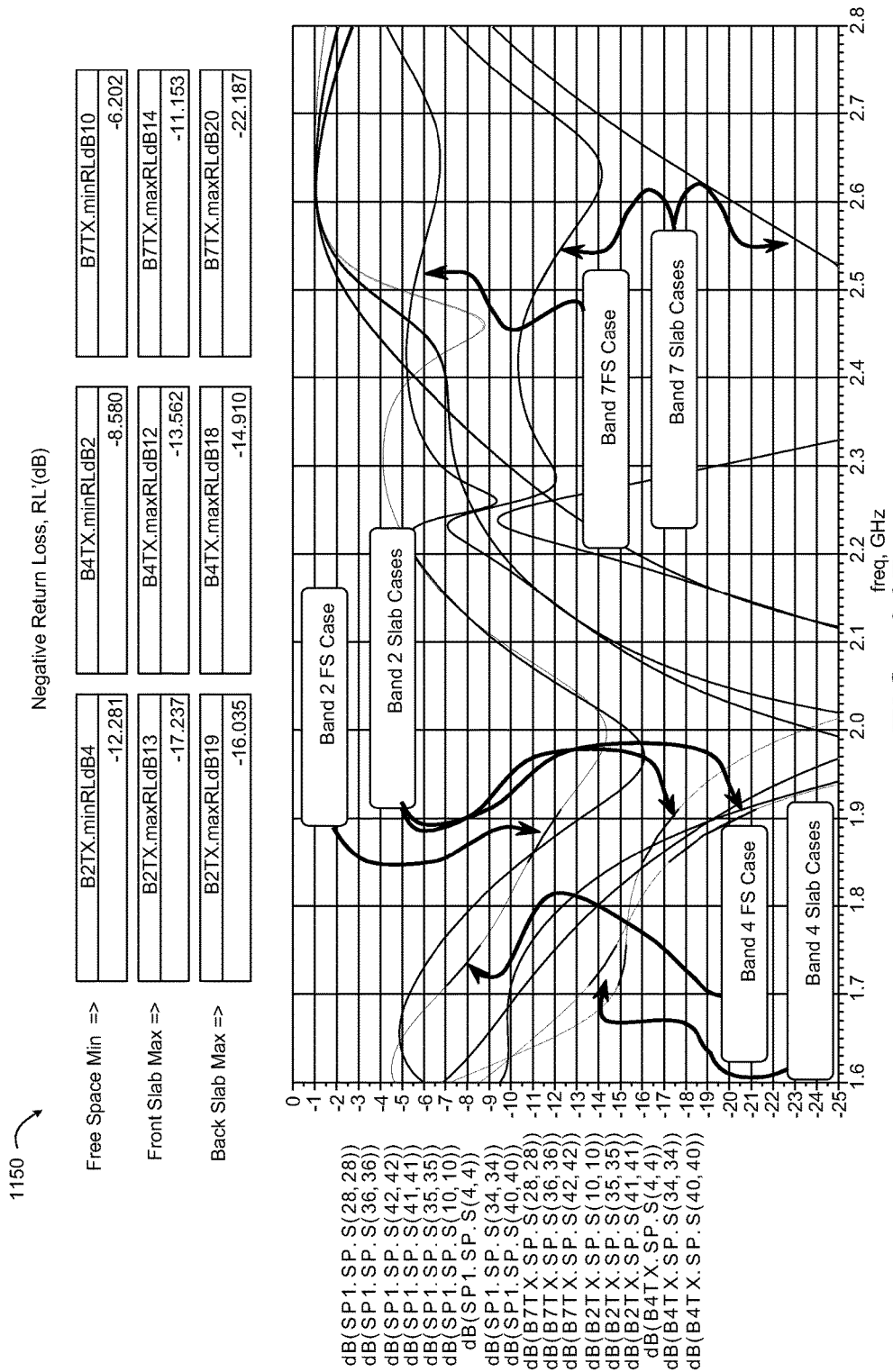

Similarly, in graphical plots 1100, 1150 respectively in FIGS. 11A-11B, RL calculations are presented for the front and back 0 mm slab antenna positions and compared to the RL in the FS position. Finally, the investigation looks at the RL performance of Design 3 for the 0 mm slab position. Inspecting plotted results from the simulation indicates that for all of the 0 mm slab cases, the minimum RL is higher than the maximum FS RL. Thus for Design 3, RL could be a suitable indicator for detecting the 0 mm slab positions for all of the bands. For the main antenna matching circuit example in which the matching circuit is adjusted for maximum RL in the 10 mm slab position (i.e. Design 2), the minimum RL in the 10 mm slab position exceeds the maximum RL in the free space position for the low bands but not necessarily for the high bands. For the main antenna matching circuit example in which the matching circuit is adjusted for maximum RL in the 0 mm slab position (i.e. Design 3), the minimum RL in the 0 mm slab position exceeds the maximum RL in the free space position for all bands.

Thus the investigation concludes the following. The matching circuit designs can be adjusted by maximizing RL in the 10 mm slab position without significantly impacting Gmatch performance. Therefore, RL measurements can be used to detect the 10 mm slab in low bands or the 0 mm slab positions in the high bands. In addition, the matching circuit designs can be adjusted by maximizing RL in the 0 mm slab position, with a small Gmatch degradation, such that RL measurements can be used to detect the 0 mm position in all bands.

Figure 12:
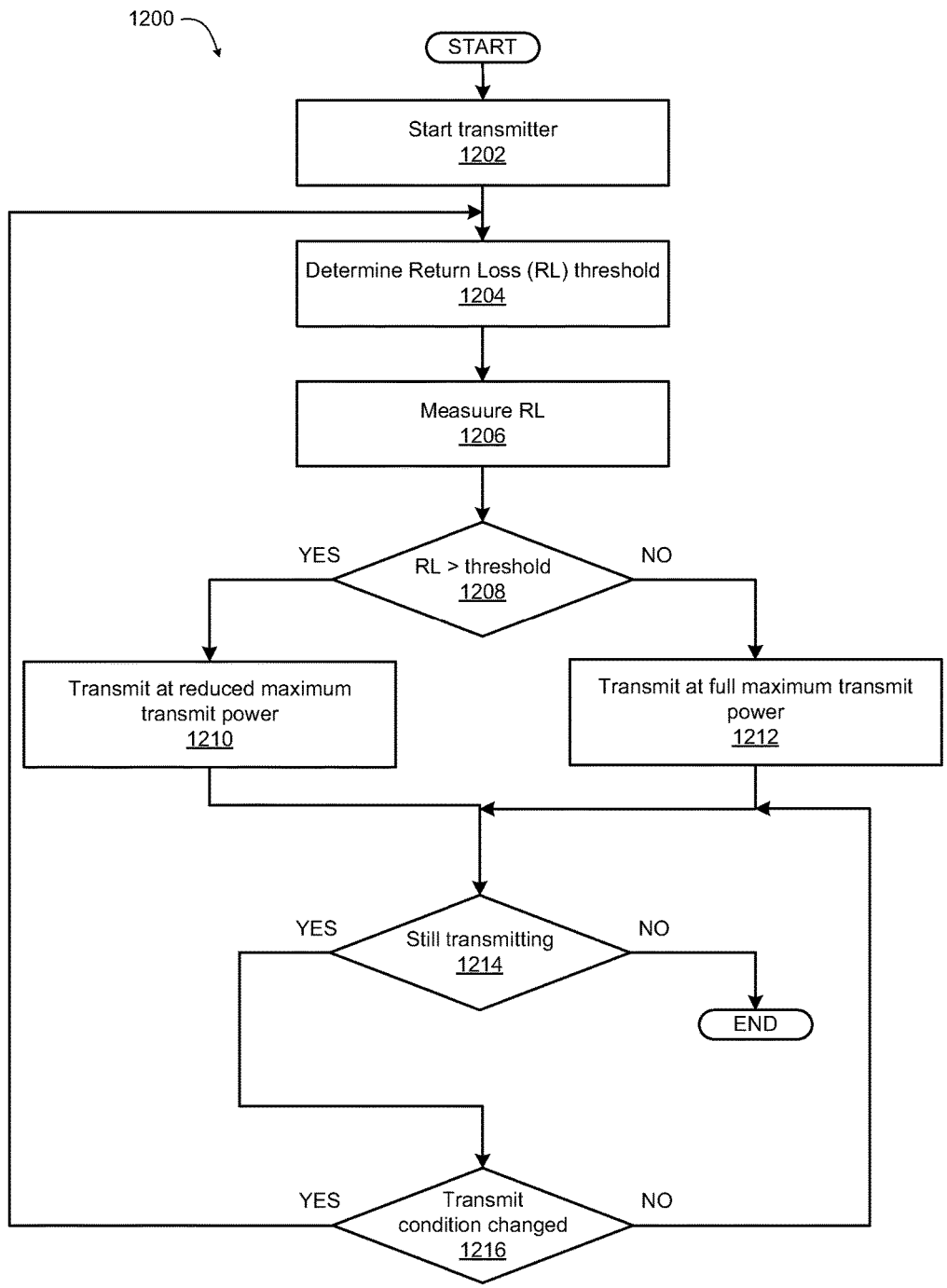
FIG. 12 illustrates a flow diagram of a method of using an RL measurement receiver to mitigate SAR exposure caused by a communication device, according to one or more embodiments.

FIG. 12 illustrates a method 1200 of using an RL measurement receiver to mitigate SAR exposure caused by a communication device. In one or more embodiments, the method 1200 includes a controller starting a transmitter (block 1202). The method 1200 includes the controller determining an RL threshold (block 1204). For example, the RL threshold can be a function of the frequency band of the transmitter. The method 1200 includes the RL measurement receiver measuring RL of at least one antenna of the communication device (block 1206). The method 1200 includes the controller determining whether the RL is greater than a threshold (decision block 1208). In response to the controller determining in decision block 1208 that the RL is greater than the threshold, the controller causes the antenna to transmit at a reduced maximum transmit power (block 1210). In response to the controller determining in decision block 1208 that the RL is not greater than the threshold, the controller causes the antenna to transmit at a full maximum transmit power (block 1212). After the controller sets the transmit power in either block 1210, 1212, the method 1200 includes the controller determining whether the transceiver is still transmitting (decision block 1214). In response to the controller determining in decision block 1214 that the transceiver is not still transmitting, the method 1200 ends. In response to the controller determining in decision block 1214 that the transceiver is still transmitting, the method 1200 includes the controller making a further determination as to whether the transmit condition has changed (decision block 1216). For example, the transmit condition can be a timer reaching a limit. For another example, the transmit condition can be an input from another sensor as to a physical change in orientation or state. In response to the controller determining in decision block 1216 that the transmit condition has not changed, the method 1200 returns to decision block 1214 to await a change in the transmit condition. In response to the controller determining in decision block 1216 that the transmit condition has changed, the method 1200 returns to block 1204 to make a new RL measurement.

Figure 13:
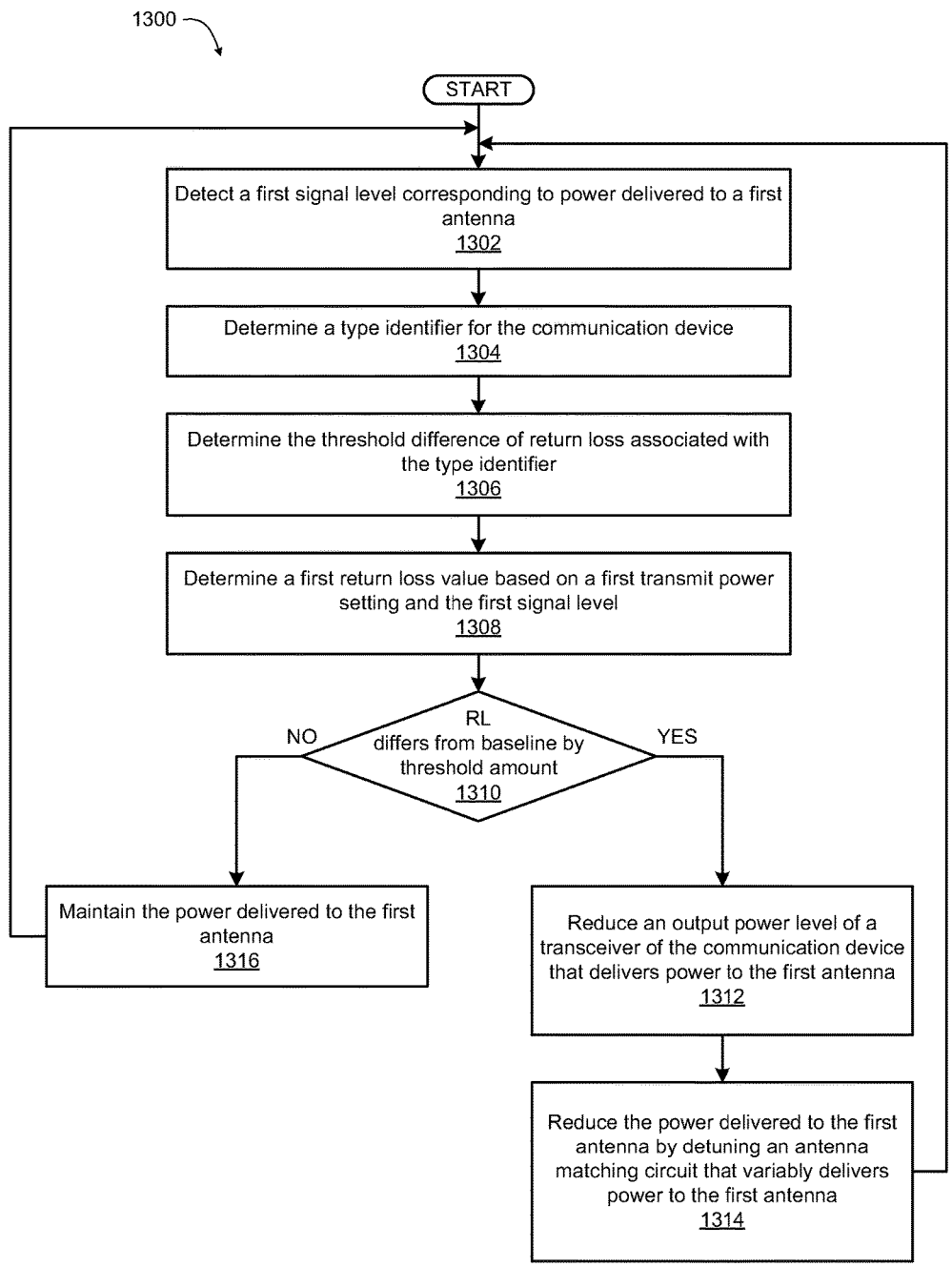
FIG. 13 illustrates a flow diagram of a method for avoiding SAR exposure to a user that is proximate to a communication device, according to one or more embodiments.

FIG. 13 illustrates a method 1300 of avoiding SAR exposure to a user that is proximate to a communication device. In one or more embodiments, the method 1300 includes an on-device measurement receiver of a communication device detecting a first signal level corresponding to power delivered to a first antenna (block 1302). The method 1300 includes the controller determining a type identifier for the communication device (block 1304). The method 1300 includes the controller determining the threshold difference of return loss associated with the type identifier (block 1306). The method 1300 includes the controller determining a first return loss value based on a first transmit power setting and the first signal level (block 1308). The method 1300 includes the controller determining whether the first return loss value differs from a baseline value by the threshold amount (decision block 1310).

In response to determining in decision block 1310 that the first return loss value differs by the threshold amount, the communication device reduces the power delivered to the first antenna. In one or more embodiments, the controller reduces the power delivered to the first antenna by reducing an output power level of a transceiver of the communication device that delivers power to the first antenna (block 1312). In one or more embodiments, the controller reduces the power delivered to the first antenna by detuning an antenna matching circuit that variably delivers power to the first antenna (block 1314). Then method 1300 returns to block 1302 to continue mitigating SAR exposure. In response to determining in decision block 1306 that the first return loss value does not differ by the threshold amount, the communication device maintains the power delivered to the first antenna (block 1316). Then method 1300 returns to block 1302 to continue mitigating SAR exposure.

Figure 14:
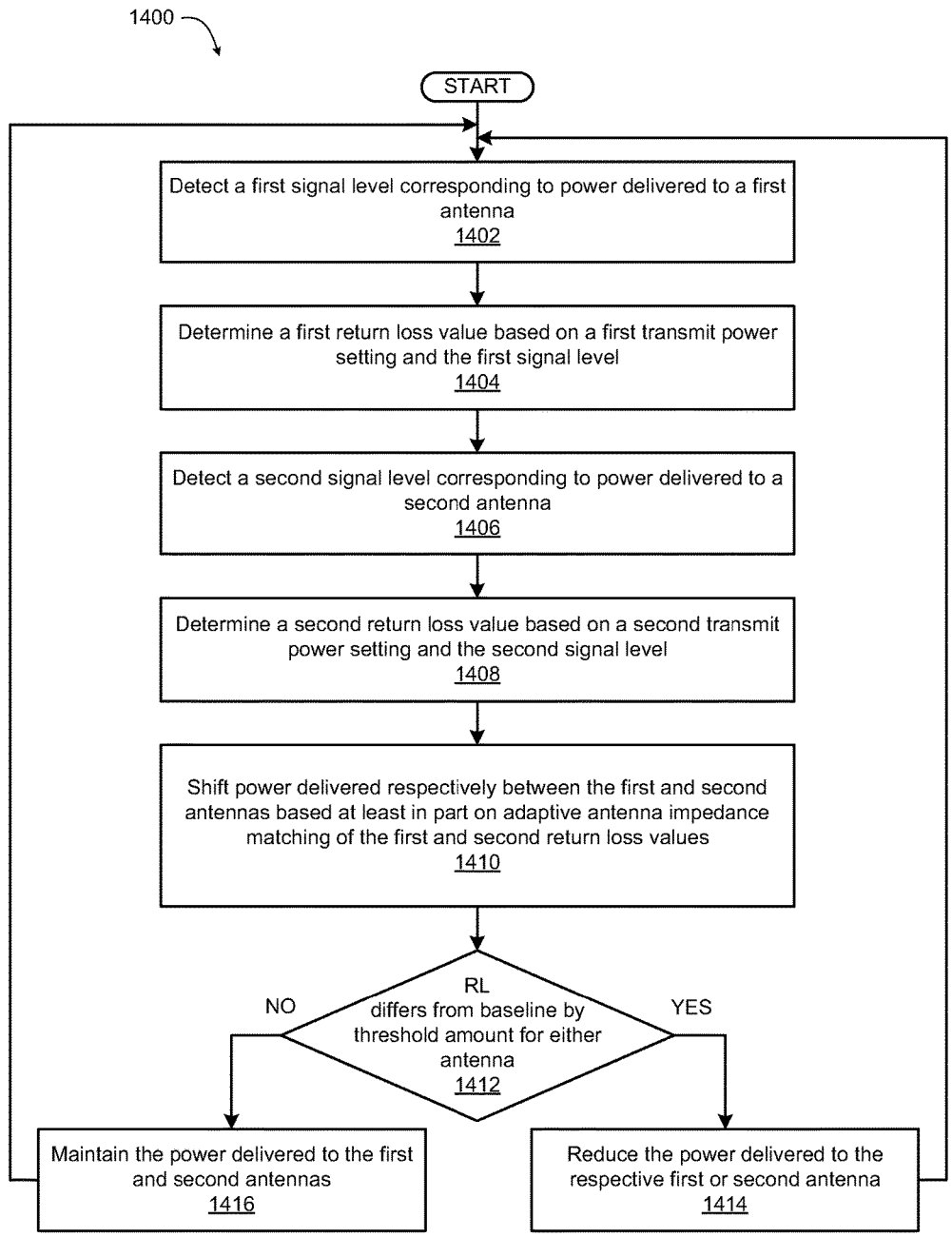
FIG. 14 illustrates a flow diagram of a method for avoiding SAR exposure to a user that is proximate to a communication device that collaboratively uses more than one antenna, according to one or more embodiments, according to one or more embodiments.

FIG. 14 illustrates a method 1400 of avoiding SAR exposure to a user that is proximate to a communication device having multiple antennas. In one or more embodiments, the method 1400 includes an on-device measurement receiver of a communication device detecting a first signal level corresponding to power delivered to a first antenna (block 1402). The method 1400 includes a controller determining a first return loss value, based on a first transmit power setting and the first signal level (block 1404). The method 1400 includes the on-device measurement receiver detecting a second signal level corresponding to power delivered to a second antenna (block 1406). The method 1400 includes the controller determining a second return loss value, based on a second transmit power setting and the second signal level (block 1408). The method 1400 includes shifting power delivered respectively between the first and second antennas based at least in part on adaptive antenna impedance matching of the first and second return loss values (block 1410). The method 1400 includes the controller determining whether either of the first or second return loss values differs from its respective baseline value by a respective threshold amount that indicates an exceedance of SAR (decision block 1412). In response to determining in decision block 1412 that either of the first or second return loss values differs by the respective threshold amount, the method 1400 includes the controller reducing the power delivered to the respective first or second antenna (block 1414). Then method 1400 returns to block 1402 to continue mitigating SAR exposure. In response to determining in decision block 1412 that neither of the first or second return loss values differs by the respective threshold amount, the method 1400 includes the controller maintaining the power delivered to the respective first or second antenna (block 1416). Then method 1400 returns to block 1402 to continue mitigating SAR exposure.

In the above described flow charts of FIGS. 12-14, one or more of the methods may be embodied in an automated controller that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

Aspects of the present innovation are described below with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

While the innovation has been described with reference to exemplary embodiments, it will be understood by those skilled in the art that various changes may be made and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description, but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. A method comprising:
   detecting, by an on-device measurement receiver of a communication device, a first signal level corresponding to power delivered to a first antenna;
   determining a first return loss value based on a first transmit power setting and the first signal level;
   determining whether the first return loss value differs from a baseline value by a first threshold amount;
   in response to determining that the first return loss value differs by the first threshold amount, reducing the power delivered to the first antenna by detuning an antenna matching circuit that variably delivers power to the first antenna;
   determining whether the first return loss value differs from the baseline value by a second threshold amount that is greater than the first threshold amount; and
   in response to determining that the first return loss value differs by the second threshold amount, reducing an output power level of a transceiver of the communication device that delivers power to the first antenna.

2. The method of claim 1, further comprising:
   detecting, by the on-device measurement receiver, a second signal level that corresponds to power delivered to a second antenna of the communication device;
   comparing a second transmit power setting to the second signal level to determine a second return loss value;
   shifting power delivered respectively between the first and second antennas based at least in part on adaptive antenna impedance matching of the first and second return loss values;
   determining whether either of the first or second return loss values differs from its respective baseline value by a respective threshold amount that indicates an exceedance of Specific Absorption Rate (SAR); and
   in response to determining that either of the first or second return loss values differs by the respective threshold amount, reducing the power delivered to the respective first or second antenna.

3. The method of claim 1, further comprising:
   determining a type identifier for the communication device; and
   determining the threshold difference of return loss associated with the type identifier.

4. A communication device comprising:
   a first antenna;
   a transceiver in communication with the first antenna and which delivers power to at least the first antenna via an antenna matching circuit that variably delivers the power to the first antenna;
   an on-device measurement receiver that detects a first signal level that corresponds to the power delivered to a first antenna;
   a controller in communication with the transceiver and the on-device measurement receiver, wherein:
      the controller compares a first transmit power setting to the first signal level to determine a first return loss value;
      the controller determines whether the first return loss value differs from a baseline value by a first threshold amount that indicates an exceedance of a Specific Absorption Rate (SAR);
      in response to the controller determining that the first return loss value differs by the first threshold amount, the controller: reduces the power delivered to the first antenna by the transceiver by detuning an antenna matching circuit;
      the controller determines whether the first return loss value differs from the baseline value by a second threshold amount that is greater than the first threshold amount; and
      in response to determining that the first return loss value differs by the second threshold amount, the controller reduces an output power level of the transceiver of the communication device that delivers power to the first antenna.

5. The communication device of claim 4, further comprising a second antenna, and wherein:
   the on-device measurement receiver detects a second signal level that corresponds to power delivered to a second antenna of the communication device;
   the controller compares a second transmit power setting to the second signal level to determine a second return loss value;
   the controller shifts power delivered respectively between the first and second antennas based at least in part on adaptive antenna impedance matching of the first and second return loss values;
   the controller determines whether either of the first or second return loss values differs from its respective baseline value by a respective threshold amount that indicates an exceedance of SAR; and
   in response to the controller determining that either of the first or second return loss values differs by the respective threshold amount, the controller reduces the power delivered to the respective first or second antenna.

6. The communication device of claim 4, wherein the controller determines a type identifier for the communication device; and determines the threshold difference of return loss associated with the type identifier.

7. The communication device of claim 4, further comprising at least one memory device that contains an application and that is configured to store a set of instructions that are executed by the controller.

8. The communication device of claim 4, wherein the antenna matching circuit comprises a plurality of fixed inductors and capacitors, including a single tunable capacitor, the fixed inductor and capacitors set to fixed values in a design of the antenna matching circuit, and the single tunable capacitor being programmable to a tunable capacitor value during operation.

9. The communication device of claim 8, wherein a programmable capacitor value can be programmed as a function of operating frequency to enable the antenna to be employed over a wide range of operating frequency, while a bandwidth of the antenna and the matching circuit is relatively low in any of the programming states is relatively narrow.

10. The communication device of claim 8, wherein the programmable capacitor is a barium strontium titanate tunable capacitor with tuning voltages restricted to the 3.5-22 V.

11. The communication device of claim 4, wherein the antenna matching circuit comprises the on-device measurement receiver.

12. A program product comprising:
a controller-readable storage device having stored thereon program code that, when executed, configures by a controller of a communication device having at least first antenna and the controller communicatively connected with a transceiver that provides power to the first antenna and with an on-device measurement receiver, the program code configures the controller to perform executable operations comprising:
receiving from the on-device measurement receiver, a first signal level that is detected by the on-device measurement receiver and which corresponds to power delivered to a first antenna;
comparing a first transmit power setting to the first signal level to determine a first return loss value;
determining whether the first return loss value differs from a baseline value by a first threshold amount that indicates an exceedance of a Specific Absorption Rate (SAR); and
in response to determining that the first return loss value differs by the first threshold amount, reducing the power delivered to the first antenna by detuning an antenna matching circuit that variably delivers power to the first antenna;
determining whether the first return loss value differs from the baseline value by a second threshold amount that is greater than the first threshold amount; and
in response to determining that the first return loss value differs by the second threshold amount, triggering a reduction in an output power level of the transceiver of the communication device that delivers power to the first antenna.

13. The program product of claim 12, further comprising program code that configures the controller to perform the processes of:
detecting, by the on-device measurement receiver, a second signal level that corresponds to power delivered to a second antenna of the communication device;
comparing a second transmit power setting to the second signal level to determine a second return loss value;
shifting power delivered respectively between the first and second antennas based at least in part on adaptive antenna impedance matching of the first and second return loss values;
determining whether either of the first or second return loss values differs from its respective baseline value by a respective threshold amount that indicates an exceedance of SAR; and
in response to determining that either of the first or second return loss values differs by the respective threshold amount, reducing the power delivered to the respective first or second antenna.

14. The program product of claim 12, further comprising program code that configures the controller to perform the processes of:
determining a type identifier for the communication device; and
determining the threshold difference of return loss associated with the type identifier.

* * * * *